United States Patent
Workman et al.

(10) Patent No.: US 12,430,187 B2
(45) Date of Patent: Sep. 30, 2025

(54) REAL TIME CONTEXTUAL EVENT NOTIFICATION SYSTEM WITH CALL STATE AWARENESS

(71) Applicant: Verint Americas Inc., Alpharetta, GA (US)

(72) Inventors: Paul Workman, London (GB); Ryan Coram, Melville, NY (US); Brendan Killen, Londonderry (GB); Chris Schnurr, Londonderry (GB)

(73) Assignee: Verint Americas Inc., Alpharetta, GA (US)

( * ) Notice: Subject to any disclaimer, the term of this patent is extended or adjusted under 35 U.S.C. 154(b) by 202 days.

(21) Appl. No.: 18/217,161

(22) Filed: Jun. 30, 2023

(65) Prior Publication Data

US 2024/0004729 A1 Jan. 4, 2024

Related U.S. Application Data

(60) Provisional application No. 63/357,880, filed on Jul. 1, 2022.

(51) Int. Cl.
*G06F 9/54* (2006.01)
*H04L 9/40* (2022.01)

(52) U.S. Cl.
CPC .............. *G06F 9/542* (2013.01); *G06F 9/547* (2013.01); *H04L 63/0884* (2013.01)

(58) Field of Classification Search
CPC ....... G06F 9/542; G06F 9/547; H04L 63/0884
See application file for complete search history.

(56) References Cited

U.S. PATENT DOCUMENTS

| 8,549,629 | B1 | 10/2013 | McCreesh et al. |
| 8,782,668 | B1 | 7/2014 | McCreesh et al. |
| 8,787,532 | B1* | 7/2014 | Adam ................ H04M 3/5175 379/265.06 |
| 10,397,740 | B2* | 8/2019 | Lalka .................... H04L 51/043 |
| 11,064,072 | B1* | 7/2021 | Sawala .............. H04M 3/2281 |
| 11,178,282 | B1* | 11/2021 | Ramachandran ... H04M 3/5175 |
| 2004/0128359 | A1* | 7/2004 | Horvitz .................. H04L 51/56 709/206 |
| 2004/0194110 | A1* | 9/2004 | McKee ................ G06Q 10/10 719/310 |
| 2004/0194116 | A1* | 9/2004 | McKee ................ G06F 9/542 719/318 |

(Continued)

FOREIGN PATENT DOCUMENTS

WO 2015184359 A2 12/2015

OTHER PUBLICATIONS

Extended European Search Report issued for Application No. 23167059.7, dated Aug. 25, 2023.

*Primary Examiner* — Mohamed A. Wasel
(74) *Attorney, Agent, or Firm* — Meunier Carlin & Curfman LLC

(57) ABSTRACT

A real time contextual event notification system that ingests events as streams from any authorized entity applies rules to the event streams, determines a context of an end-user who is a recipient of a targeted notification, and provides notifications to the end-user in accordance with the context. The event streams may come from multiple sources and rules may be applied to provide real time contextual information associated with the end-user.

20 Claims, 21 Drawing Sheets

(56) References Cited

U.S. PATENT DOCUMENTS

| | | | |
|---|---|---|---|
| 2011/0173620 A1* | 7/2011 | Dyer | G06F 9/542 |
| | | | 714/48 |
| 2014/0208172 A1 | 7/2014 | Schnurr et al. | |
| 2019/0265865 A1* | 8/2019 | Yaseen | G06Q 30/016 |
| 2020/0259948 A1* | 8/2020 | Keohane | H04M 1/72463 |
| 2020/0358898 A1 | 11/2020 | Singer et al. | |
| 2024/0004729 A1* | 1/2024 | Workman | G06F 9/547 |

\* cited by examiner

| 1 | Information | | Default icon shown if iconID is zero or missing | do not show if in focus assist mode |
|---|---|---|---|---|
| 2 | Confirmation | | Displayed as success or positive reinforcement | do not show if in focus assist mode |
| 3 | Error | | Displayed for generic error | Always show |
| 4 | Warning | | Displayed for generic warning | Always show |
| 5 | Question | | Displayed for generic question | do not show if in focus assist mode |
| 6 | Overtalk | | Detected over-talk / cross talk in conversation | Always show |
| 7 | Frustrated customer | | Detected Unsatisfied customer | Always show |
| 8 | Satisfied customer | | Detected satisfied customer | Always show |
| 9 | Escalation | | Customer wishes to speak to manager | Always show |
| 10 | Latency | | Customer has been on hold for long time - apologise for wait | Always show |

*FIG. 7*

| Title | Source | Description Text | New |
|---|---|---|---|
| Complaint | RTAA | Customer is complaining, exercise empathy | Complaint — Customer may be complaining, please consider exercising empathy. Accurate? |
| Long time to respond | RTAA | Customer is on hold for too long, thank the customer for holding | Long time to respond — Customer is on hold for too long, thank the customer for holding. Accurate? |
| Frustrated Customer | RTAA | Try to relate | Frustrated Customer — Try to relate. Accurate? |
| Satisfied Customer | RTAA | Keep up the positive attitude | Satisfacted Customer — Keep up the positive attitude. Accurate? |
| Use Positive Language | RTAA | Try a positive approach | Use Positive Language — Try a positive approach. Accurate? |
| Escalation | RTAA | Seek manager assistance | Escalation — Customer is escalation, seek help from manager. Accurate? |

*FIG. 8A*

| | | | |
|---|---|---|---|
| Over-talk | RTAA | Let the customer complete their sentence before responding | Interruption Let the customer complete his sentence before responding. Accurate? |
| Hold time | Application Trigger | Customer is on hold for too long, thank the customer for holding | Future |
| DPA Info message | DPA | <defined by customer> Also buttons / links | Offer discount Customer is classified as VIP, offer discount to retain subscription. Helpful? |
| DPA Error Message | DPA | <defined by customer> Also buttons / links | Error Something the agent did wrong, followed by instructions how to perform the task properly. Helpful? |
| DPA warning Message | DPA | <defined by customer> Also buttons / links | DPA Warning Title Warning description, followed by instructions how to perform the task properly. Helpful? |
| DPA Success Message | DPA | <defined by customer> Also buttons / links | DPA Success Title Action success description. Helpful? |

*FIG. 8B*

REAL TIME CONTEXTUAL EVENT NOTIFICATION SYSTEM WITH CALL STATE AWARENESS

CROSS-REFERENCE TO RELATED APPLICATIONS

This application claims priority to and incorporates by reference U.S. Provisional Patent Application Ser. No. 63/357,880 filed on Jul. 1, 2022, and entitled Real Time Contextual Event Notification System with Call State Awareness.

FIELD

The present disclosure generally relates to event notification systems, and, more specifically, to event notification systems and methods that deliver context-rich notifications and automatic coaching to a user based on real-time speech and acoustic detection.

BACKGROUND

Event notification systems often manage singular events using an "if this, then that" paradigm to provide prompts to users. The notifications provided by conventional systems do not account for the context of the notification; that is, they are delivered without regard to the state of the recipient or the circumstances that generated the notification. Earlier messaging and notification systems could produce messages that were output to a user's screen, but the messages were often delivered in a one-to-one relationship to a particular input. There was no intelligent context added from other activities that were occurring simultaneously at a user's computer. When these kinds of notifications were delivered out of context, they were less useful to an end user. A need exists for adding more context information to notifications arriving at a client device from an event and notification server.

SUMMARY

The present disclosure describes methods and systems for providing real time contextual event notifications to an end-user, such as a support agent in a contact center. The system provides a RESTful API end point to consume real time events from a variety of sources that supply the real time events as streams. A managed streaming component processes the event streams by topic and context to generate notifications that are sent to the end-user in a targeted manner.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

In one embodiment, a method of providing real time contextual event notifications begins with receiving, at a recorder management system, communications data from a source, wherein the recorder management system includes a real time analytics framework, a real time integrations framework, a recorder integration server, and a recorder archive server. At least one authentication procedure is used to verify the source of the communications data. A recorder archive server provides computer memory within the recorder management system to implement a work assist service process and store call event data in the computer memory. Call event data is transmitted from the recorder archive server to a work assist server having a managed streaming component operating in the work assist server. Call event data is processed at the managed streaming component to determine a context to generate event notifications. The work assist server communicates event notifications to a client management system that determines a target client to receive the event notifications.

Systems and computer program products follow from the method embodiment.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 7 illustrates example icons that may be used to convey event notifications according to certain embodiments;

FIG. 8A illustrates example notifications that may be presented in the user interface of a client application according to certain embodiments;

FIG. 8B illustrates example notifications that may be presented in the user interface of a client application according to certain embodiments;

DETAILED DESCRIPTION

System Overview

Existing Call Recorder systems are augmented to be "Work Assist Aware". This disclosure, therefore, enables a recorder system to send call state data to the Work Assist notification system, via a universal Daemon Flow authentication method. In turn, the notification system can adjust its user interface based on the call state in real time. Different user experiences can be given for any of the different call states available from the recorder system.

Modern contact centers utilize omnichannel communications to connect customers with support agents over, such as e-mails, live chat, social media, Short Message Service (SMS) messaging, and support tickets, to create a seamless user experience. A transaction history of the customer interactions over the various channels is maintained by the contact center. For example, if a customer initiates a chat session, the information from the chat session is available to a live support agent should the customer decide to ask to speak with a support agent while chatting. Customer interactions within the contact center may be viewed as a system of many parallel streams of events occurring in real time. On their own, each event stream only describes a small fraction of the activity within the overall system, but when combined in a fully scalable and resilient manner in accordance with the disclosure hereinbelow, complex business rules may be holistically applied to the system. Further, a context may be derived from each event stream in real time. This derived context allows for complex decisions to be made, and the associated outcomes provided to, support agents to assist in agent decision making. These advancements help achieve a desirable outcome to address a customer's purpose for contacting the contact center. One non-limiting aspect of this disclosure is that the systems and methods described herein process the parallel streams of events in parallel processing steps implemented by a computer. In particular, desktop notification events are processed in parallel to call events originating at support agent end user client device (client 124 discussed below).

Architecture Description

Figure 1A:
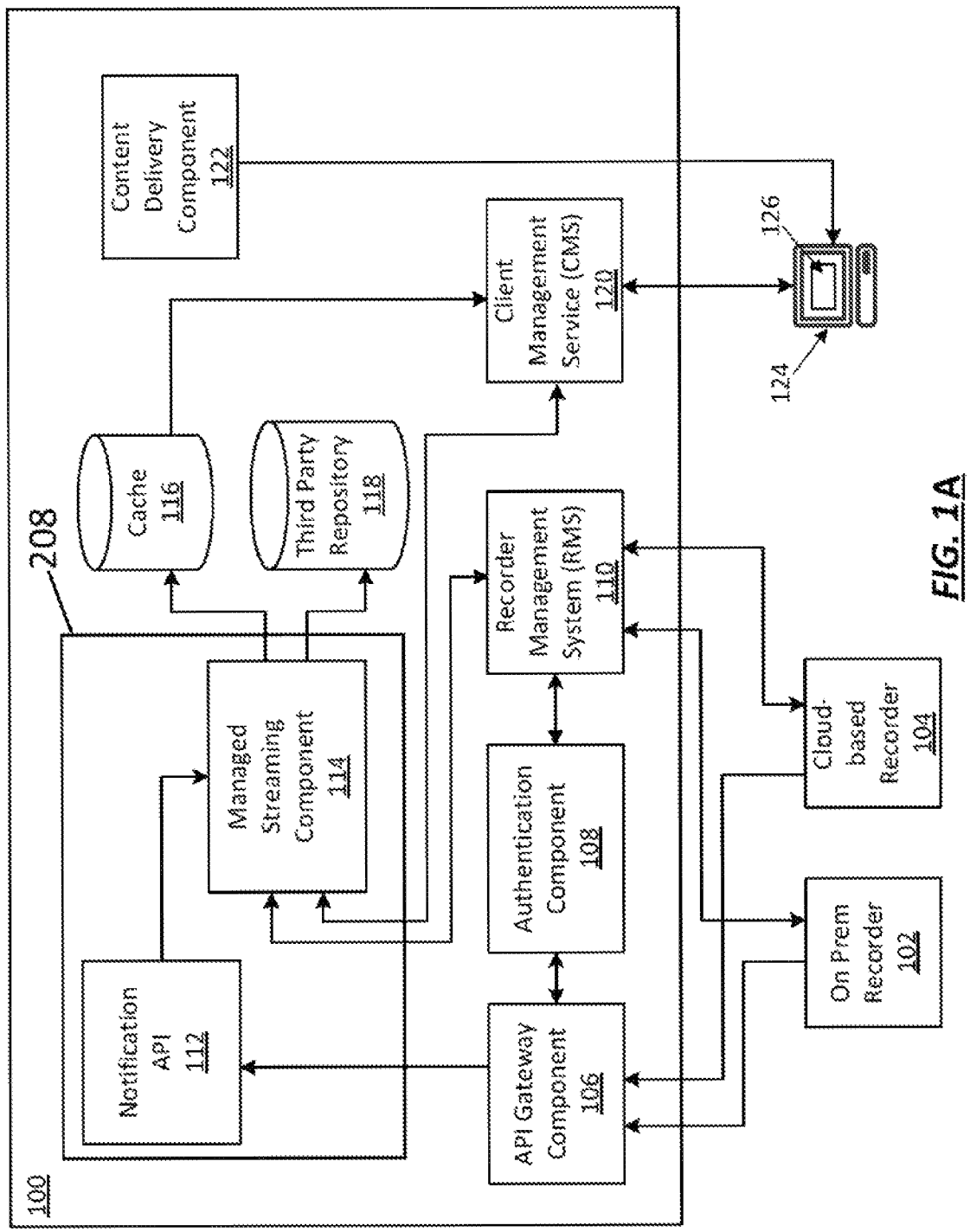
FIG. 1A illustrates an overview of the components of the real time contextual event notification system according to certain embodiments.
Figure 1B:
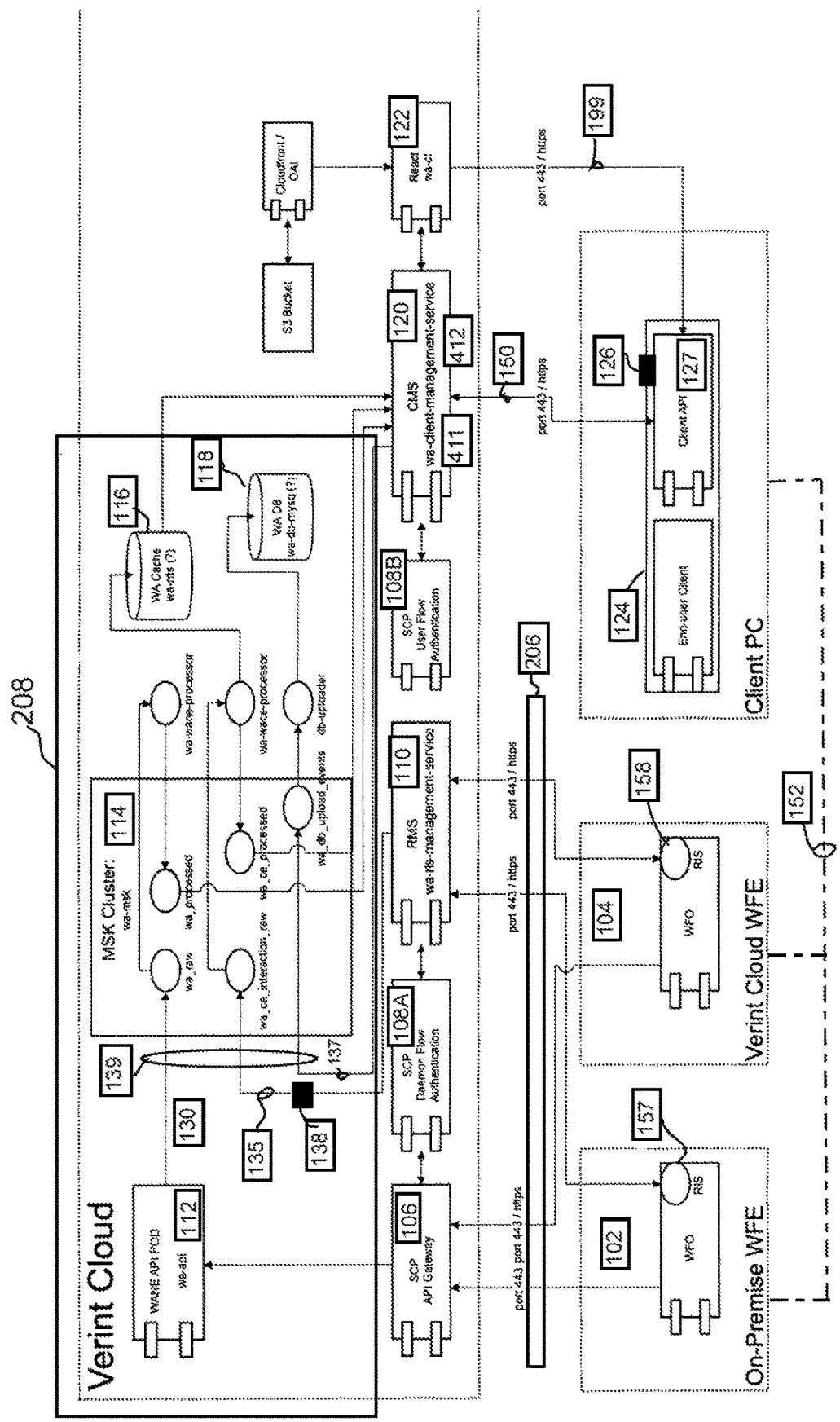
FIG. 1B illustrates an overview of the components of the contextual event notification system according to certain embodiments.

Referring to FIGS. 1A and 1B, there is illustrated an overview of a real time contextual event notification system 100, its components, services, and processes according to certain embodiments. In an implementation, the real time contextual event notification system 100 is a cloud-based real time messaging system that ingests event streams (e.g., notification events 130, call events 135, and real time call data 137 shown in FIG. 1B) as streams from any authorized entity, determines a context of a support agent and provides notifications to the support agent in accordance with the context data. The event streams may come from multiple sources, and rules may be applied to provide real time contextual event notifications that are event notifications associated with a condition or state of a user, a state of a particular call at a client device, and a circumstance that generated the event stream (for example, a support agent interaction with a customer), such as, "only show this message when the user is no longer on a phone call," "wait until the user stops editing this document before showing the next message," or "only show this information when the user starts speaking to a customer and they open a particular sub-menu and the customer has mentioned a particular key word."

Sources of event streams provided to the real time contextual event notification system 100, may include on-premises servers (for example, a recorder integration server 102 available from Verint Systems, Inc. of Melville, NY) and cloud-centric servers (for example, a cloud-based recorder server 104). The recorder integration server 102 and/or cloud-based recorder server 104 may capture call status information (call awareness data), audio (linguistic events), and screen activity (application events) associated with communications conducted between the customer and the support agent. The communications may occur on multiple channels, including but not limited to, telephone calls, wireless communications of all kinds, texts, chats, emails, voicemails, videos, teleconferences and the like. The video, audio and screen activity may be recorded so that it can be evaluated according to business needs. In an implementation, events may be messaged to the real time contextual event notification system 100 in accordance with rules applied to the source of the captured activity to provide context information for a particular call scenario, including call state awareness events, linguistic events and application events.

Linguistic events are determined, for example, not only from real time communication analysis, but also from speech-to-text transcripts of audio conversation(s) conducted between customers and support agents. If the communications are not already in textual format, in some embodiments, transcripts of the communications are analyzed by a real time analytics framework (see, FIG. 2) to identify the grouping and organization of the words and phrases spoken during calls that meet certain classification criteria. The analysis may identify themes that reveal trends and areas of opportunity or concern.

Application events are determined, for example, as a customer or support agent interacts with a user interface. For example, a user interface component may capture keystrokes, mouse clicks, screen touches, data submissions, etc. Each interaction with the user interface may be considered an application event and the real time analytics framework may use this information to determine how the customer and/or agent is interacting with an application presented in the user interface.

Call states allow the system to know the current activity on an agent communications port. When providing event notifications to an end user, the state of the call (on hold, active, terminated, etc.) can help determine what kind of notifications are useful at that point.

In an implementation, rules to manage the event notification system 100 are distributed among the various connected sources. In another implantation, the rules may be centralized within the real time contextual event notification system 100 and applied to the event messages that are received from various sources. A hybrid approach may also be used where rules are applied at the source(s) and at the real time contextual event notification system 100.

A recorder management system (RMS) 110 serves as an endpoint to which the recorder integration server 102 and/or cloud-based recorder server 104 interface connect, for example, over a socket connection. The RMS 110 assists in managing the connections of the local, on-premises recorder server 102 and/or cloud-based recorder server 104, and, together with an authentication component 108, may authenticate incoming connections, process incoming messages, validate the schema of an incoming message, and validate the data passed in the message by adding a token to each message. In non-limiting embodiments, the authentication component 108 uses a "Daemon Flow" authentication mechanism to enable the socket to be connected irrespective of the location of the recorder (i.e., on-premises or in the cloud). The RMS 110 may receive interaction and analytics events from the recorder integration server 102 and/or cloud-based recorder server 104 that are used to, for example, determine the context of an interaction between the customer and the agent.

Figure 2:
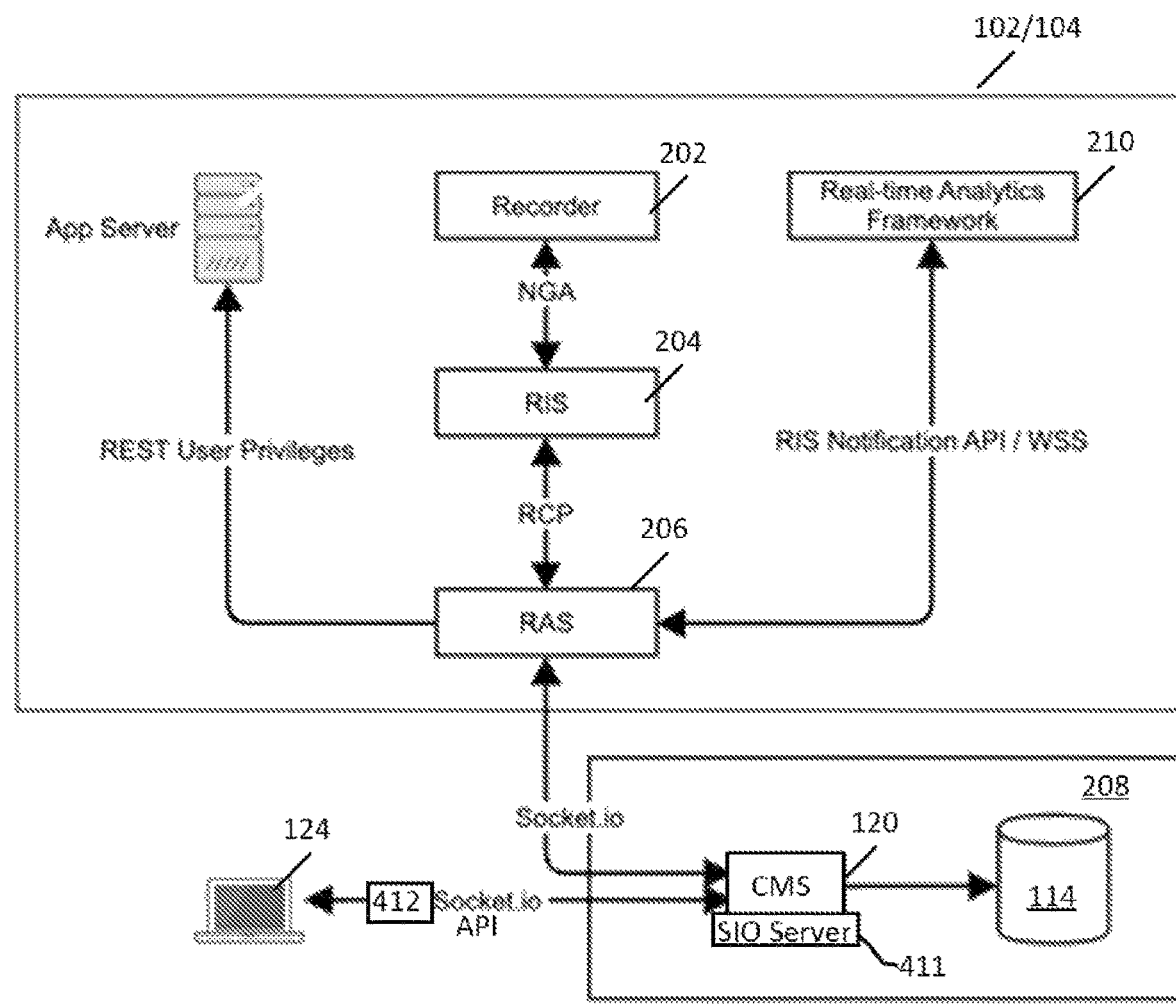
FIG. 2 illustrates additional details of the recorder integration server and cloud-based recorder server and a call event API that is utilized to convey event data according to certain embodiments.

This disclosure utilizes both a web socket connection application programming interface (API) 412 and a RESTful API 112 to provide dual functionality in receiving parallel event streams according to this disclosure. As shown in FIG. 1B, real time communications data (e.g., call data) 150 is provided to a cloud-based client management service 120 via a socket network system (e.g., socket.io server 411) and web socket connection API 412. This communications data 150 may be a direct input 137 to a managed stream component 114. Also, the fact that original communications data 150 is ready to be received from an active call at the end user device 124 sets off a chain of events that allows the event notification system 100 to implement its work assist notification bus (collectively 139) with fully authenticated data. On the socket level, and shown further in FIGS. 1B and 5, the original communications data 150 is authenticated by a desktop authentication protocol as a user flow authentication 108B. As shown in FIGS. 1A, 1B, and 2, the original communications data 150 may be additionally directed to workflow enhancement operations 152 utilizing an on-premises recorder server 102 and/or cloud-based recorder server 104. The original communications data 150 that has traversed the various servers utilizes a web socket connection API 412 to initiate a Daemon Flow authentication 108A, with the goal being additional communications to the RESTful API endpoint 112 in the work assist agent server 208. In one non-limiting embodiment, the web socket connection API 412 is in communication with the client management system 120 and gives the client management server 120 access to original communications data 150 (such as raw call data 137), while the RESTful API 112 operates on application data 130, call event data 135, and linguistic inputs discussed below that are collected from an entity's recording integrations server 204 via a recording management system RMS 110.

The on-premises recorder server 102 and/or cloud-based server 102, 104 may include or be connected to respective recorder integration servers (RIS) 157, 158, referred to generally in FIG. 2 as RIS 204. FIG. 2 notably illustrates how the web socket connection API 412, and the web socket inputs and outputs may be in communication with recorder hardware, such as the RIS 204 and an associated Recorder Archive Server (RAS) 206. FIG. 2 also illustrates how the RAS may house libraries of REST user privileges that are then directed to an overall work assist agent server 208 (i.e., an agent server that provides work assist notifications and messages to an end user client computer 124). In other words, the web socket connection API 412 is tied to original communications data 150 being actively communicated to any one or all of a client management system 120, an on-premises recorder integration server 157 or a cloud recorder integration server 158 having respective recorder systems. When the web socket connection API 412 has been authenticated at the client management system 120, then the RESTful API can retrieve REST user privileges associated with that communications data 150 to initiate the Daemon Flow authentication 108A. The Daemon Flow authentication allows the work assist server 208 to implement value added computational services to make the output messages 199, delivered to each agent end user client device 124, more robust.

The recorder integration server 102 and/or cloud-based recorder server 104 communicate with an API gateway component 106 that accepts a real time events stream as event messages over a socket connection from the recorder integration server 102 and/or cloud-based recorder server 104. The event messages include the token provided by the authentication component 108. Authenticated event messages are forwarded from the API gateway component 106 to a notification API 112 that provides a RESTful API to connect the event messages to a managed streaming component 114. In particular, received event messages are added to an event bus of the managed streaming component 114 and organized by topic. This sequence is used as shown in FIG. 1B for application events and certain call events like audio and linguistic analyses. Other process could be added as developed.

The managed streaming component 114 provides services to publish (write) and subscribe to (read) streams of events, including continuous import/export of data from other systems. The managed streaming component 114 stores streams of events into a cache 116 or third-party repository 118. The managed streaming component 114 may process event streams as they occur (i.e., in real time) or retrospectively. An example managed streaming component 114 is Apache KAFKA. The managed streaming component 114 processes the received event streams by organizing the events contained therein by raw topic, for example, a category of interest by which event message data is stored and published. The managed streaming component 114 uses information contained in call event messages provided by the RMS 110 or the CMS 120 to determine a current state of a call associated with an event stream. The call state information may be provided by the recorder integration server 102 and/or cloud-based recorder server 104 to the RMS 110 during a call between the customer and the support agent. The managed streaming component 114 stores the most current event of the call(s) and event streams (event message data and call event message data) to the cache 116 by topic for consumption by a client management system (CMS) 120 for delivery to a client 124 (and/or clients as described below as 124a, 124b, 124n).

Figure 4:
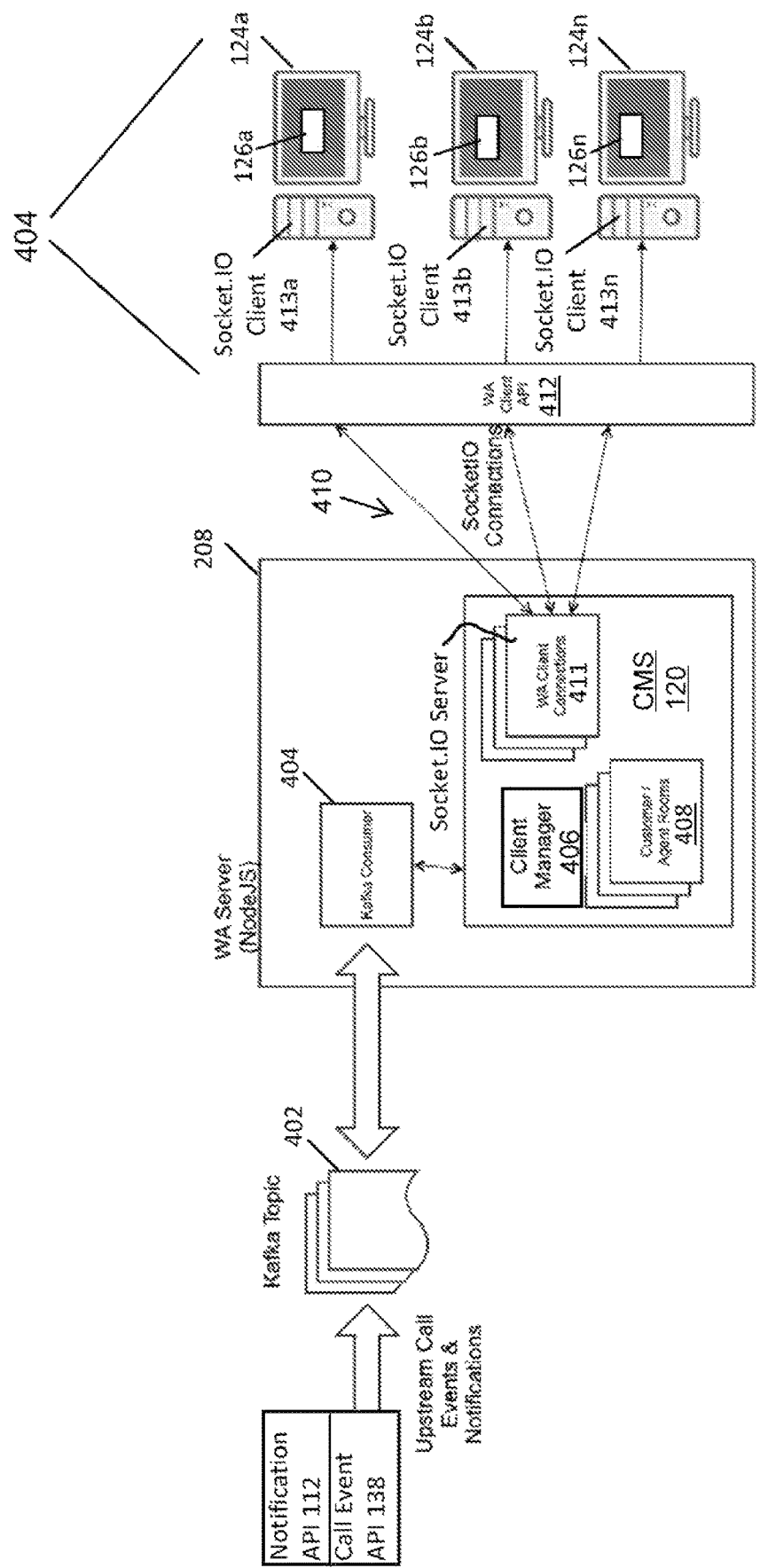
FIG. 4 illustrates a work-flow of the components within a client management system (CMS) according to certain embodiments.
Figure 5:
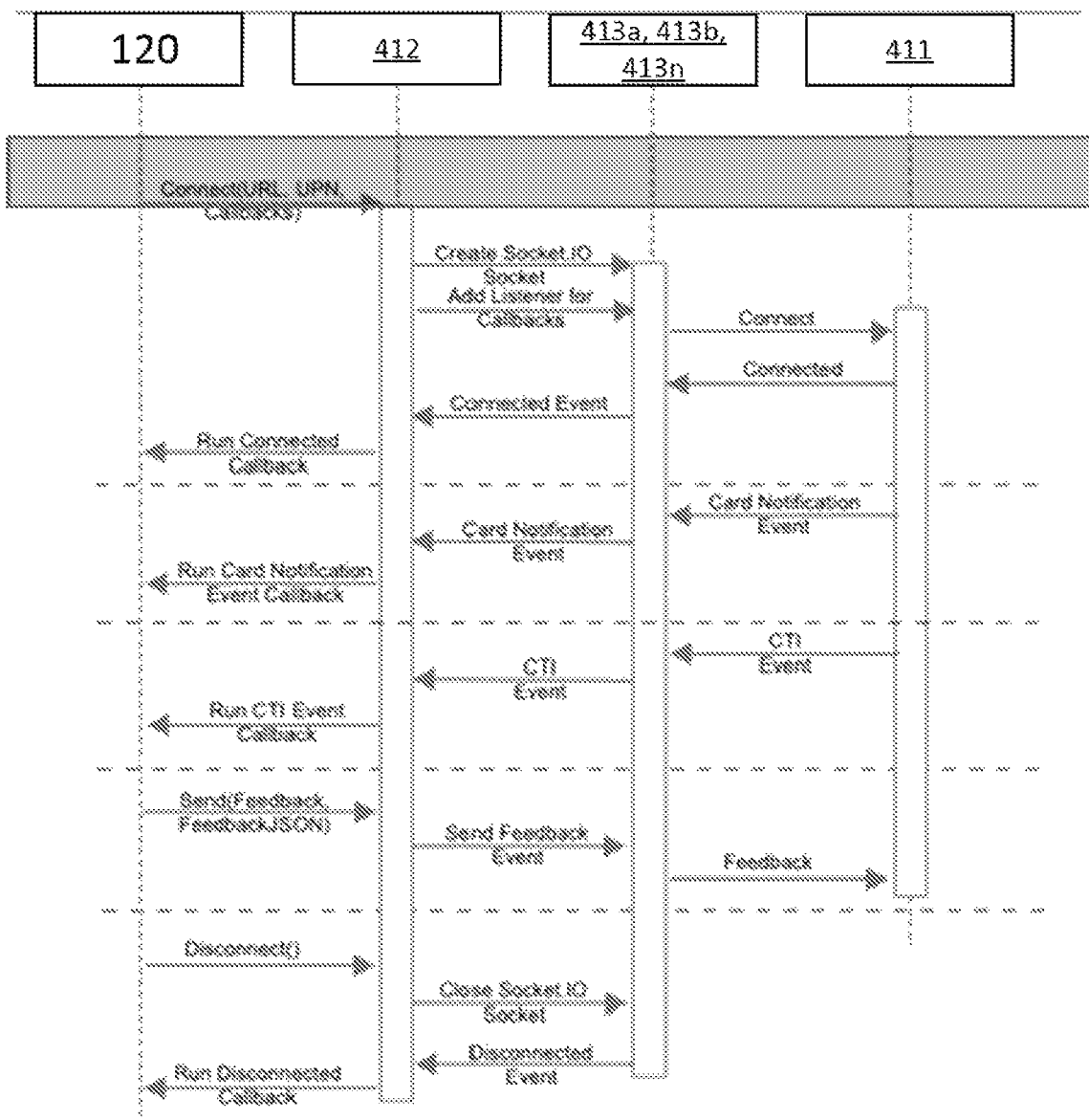
FIG. 5 illustrates a call flow diagram of communication between the components of FIG. 4 according to certain embodiments.

The CMS 120 is an API designed to wrap around Socket.IO server 411 for the handling of commands to interact with the system 100 and to receive/send events. The CMS 120 provides a flexible interface to allow third parties to the system 100 to implement their own event client application. API calls to the CMS 120 are suitably generic in that they can be extended without the need to redistribute entire new package versions. Although according to certain embodiments this package may be written in JavaScript, in other embodiments the package may be written in Dart, CoffeeScript, TypeScript, ELM, Kotlin, ClojurScript, or other web development language capable of encoding one or more features described herein. FIGS. 1B and 5 show an example of a general flow of communication between a work assist application at the work assist server 208 that communicates with a socket IO server 411. The socket IO server 411 is in communication with or housed within the client management system 120 consuming the work assist data, coaching, and notifications for display at a client device. The data from the work assist server 208 is directed to respective socket IO client connections 413 via a web socket connection API 412, that may operate at the on-premises recorder server 102 or a cloud-based recorder server 104, to provide the work assist data, coaching, and notifications to various end users 124. In a different embodiment shown in FIG. 4, the client management system 120 and the socket.io server 411 are actually connected to or housed with the work assist server 208. The placement of servers shown in the figures is not limiting of this disclosure and other arrangements are within the scope of this disclosure.

A content delivery component 122 is provided to create a user interface to be presented on a client 124. The content delivery component 122 may be provided as JavaScript libraries that are interpreted by a plugin on a client application 126 (for example, a browser) executing on the client 124 to render the user interface. The client application may be cross-platform to enable easy distribution to any client 124. Target users connect to the real time contextual event notification system 100 via a web application hosted in a native browser or desktop electron application.

event Web socket is connected to the RMS 110 and receives an event stream from a Recorder Integration Server (RIS) 204 residing within the recorder integration server 102 and/or cloud-based recorder server 104. This event stream is added to the real time contextual event notification system 100 to allow for context provided by a call recorder 202 to be used to influence notifications provided to an agent and client interface states.

In operation, as a customer conducts a voice communication session (or any other activity generating communications data 150) with an agent, the call recorder 202 records audio and screen interaction data to enable search, replay, and report on calls by topic. The call recorder 202 communicates with the RIS server 204 as it records the calls and screens data. The RIS server 204 communicates to a Recording Archive Server (RAS) 206, which creates a socket connection to the RMS 110 to make the call event API call and pass event data to the system 100. The call event API is bidirectional to enable feedback and control of the RIS server 204 from client 124.

An event service within the work assist server 208 is registered as a part of the startup sequence of AgentServerService. This service receives interaction and analytics events from a real time analytics framework 210 for calls and sends them to the system 100 via a Socket.IO connection with the RMS 110. The RMS 110 is the endpoint for the RAS Socket.IOconnections. The interaction and analytics events may be derived from acoustic analytics, linguistic analytics (for example, keywords and sentiment analysis from transcripts), biometric analytics (for example, does the person on the phone match a voice print), and desktop analytics.

When the event service starts, a list of configured tenants is obtained in order to maintain segregation of data when communicating with the RMS 110. Each tenant will have its own Socket.IO connection to the RMS 110 on a 1:1 basis. Once the list of tenants is known, the event service looks for configuration to see if the event notification is configured. This information may be contained in a configuration file, for example, "INTEGRATION_FRAMEWORK-conf.xml," as shown below:

```
1 <External>
2   <CloudConfig>
3     <EXT_VCS xmlns="http://www.verint.com/EM/Metadata/2008/Roles/EXT_VCS"
role:instanceID="855040" role:roleName="EXT_VCS" role:Identity="211">
4       <EXT_VCS_SETTINGS>
5
    <AZURE_AUTH_SCOPE>ws://application/api/auth/.default</AZURE_AUTH_SCOPE>
6         <WA_URL>https://RegionalURL/LoadBalance/Address</WA_URL>
7         <WA_UPN>Username</WA_UPN>
8       </EXT_VCS_SETTINGS>
9     </EXT_VCS>
10  </CloudConfig>
11 </External>
```

With the introduction above of the various components within the real time contextual event notification system 100, each will now be described in greater detail with reference to FIGS. 2-9.

Recorder Integration Server 102/Cloud-Based Recorder Server 104

With reference to FIG. 2, there are illustrated additional details of the recorder integration server 102 and cloud-based recorder server 104 according to certain embodiments. A call event socket connection is utilized to convey event data from the recorder integration server 102 and cloud-based recorder server 104 to the RMS 110. The call If the CloudConfig settings to successfully communicate to system 100 are not configured for any tenants, the service does not register listeners for notifications (for example, interactions and analytics events). The CloudConfig settings also contain information to pass the Verint™ Cloud Platform (VCP) Authentication Configuration to the correct cloud instance. The VCP Authentication Config is parsed from the SecuritySettings.xml file by obtaining the VCPAuthentication element, decoding it using base64 URL decoding, and then decrypting it using the CCL (AES256) decryption. The VCP Authentication Config is configured on a per-tenant basis, which means that each connection to the WA server has its own set of credentials.

When receiving interaction or analytics events from the real time analytics framework 210, a map of Session ID to Tenant IDs is populated from interaction messages to allow analytics events that do not have an explicitly set Tenant ID to be sent onward using the correct socket.IOconnection. This allows a lookup of analytics events based on the Session ID. This map is cleaned up when receiving a call end interaction message.

Provided a message has a tenant, it is then checked for a user principal name (UPN). If no UPN is present, the message is unable to be sent to a client who is logged into WA and is therefore not sent. If a message does have the Tenant ID and the UPN, it is passed to the SocketIoManager in order to be sent to WA using the correct socket.IOconnection.

The SocketIoManager contains a single executor that queues the work of sending messages via the socket.IOconnection for a given tenant. On startup and on configuration refresh, the map of Tenant to Socket.IO connections is created, and the connections themselves are established. Each of these connections requires the configuration from the VCP Authentication Config. The configuration here allows for fetching of the access token that is used when creating a Socket.IOconnection to the RMS 110.

The individual connections managed by the SocketIOManager are contained within SocketIoConnection. These connections directly handle the communication and connection to the RMS 110. In FIG. 2, one example configuration shows the client management system 120 encompassing the socket input and output server 411, both within the work assist server 208. When connecting to the RMS 110, there is a two-phase connection, where an initial connection begins with very basic communication. It listens for events on the following keywords: "Connect," "tenantInformation," "disconnect," "connect_error," "reconnect," "reconnect_attempt," and "event_close". This initial connection is to establish a connection to the RMS 110 and receive the "tenantInformation." This is done by the RMS 110 parsing the authentication token and the RMS 110 responding with a tenant. Once this information has been passed back to the SocketIoConnection, the second phase commences by creating a new namespace Socket.IOconnection. Any information sent to the RMS 110 is communicated via this new tenant-based namespace socket.

Figure 15:
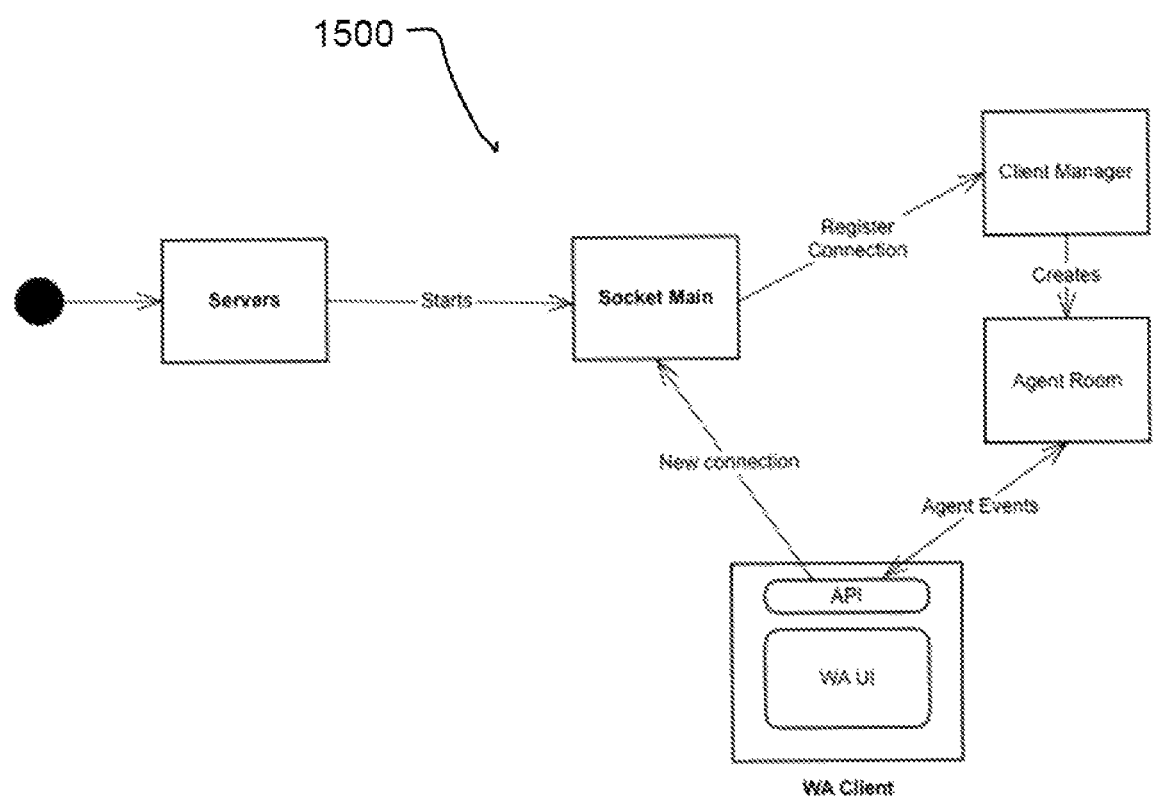
FIG. 15 is a schematic diagram of a socket input and output server that may be utilized in certain embodiments of this disclosure.

The main components of the socket input and output server ("the SocketIO server") 1500 are shown in FIG. 15 and may be:

Servers—Contains the SocketIO servers configuration. This will include dependencies, configuration and initialization (e.g. for redundancy, high availability and clustering).

Socket Main—The main listener for incoming WA Client connections. Responsible for validating/authenticating the incoming connections and registering the connection (to create the Agent Room).

Client Manager—Maintains the list of Agent Rooms (connections).

Agent Room—Responsible for the SocketIO connection with the WA Client. Contains functionality to send and receive the events from the WA Client.

Figure 16:
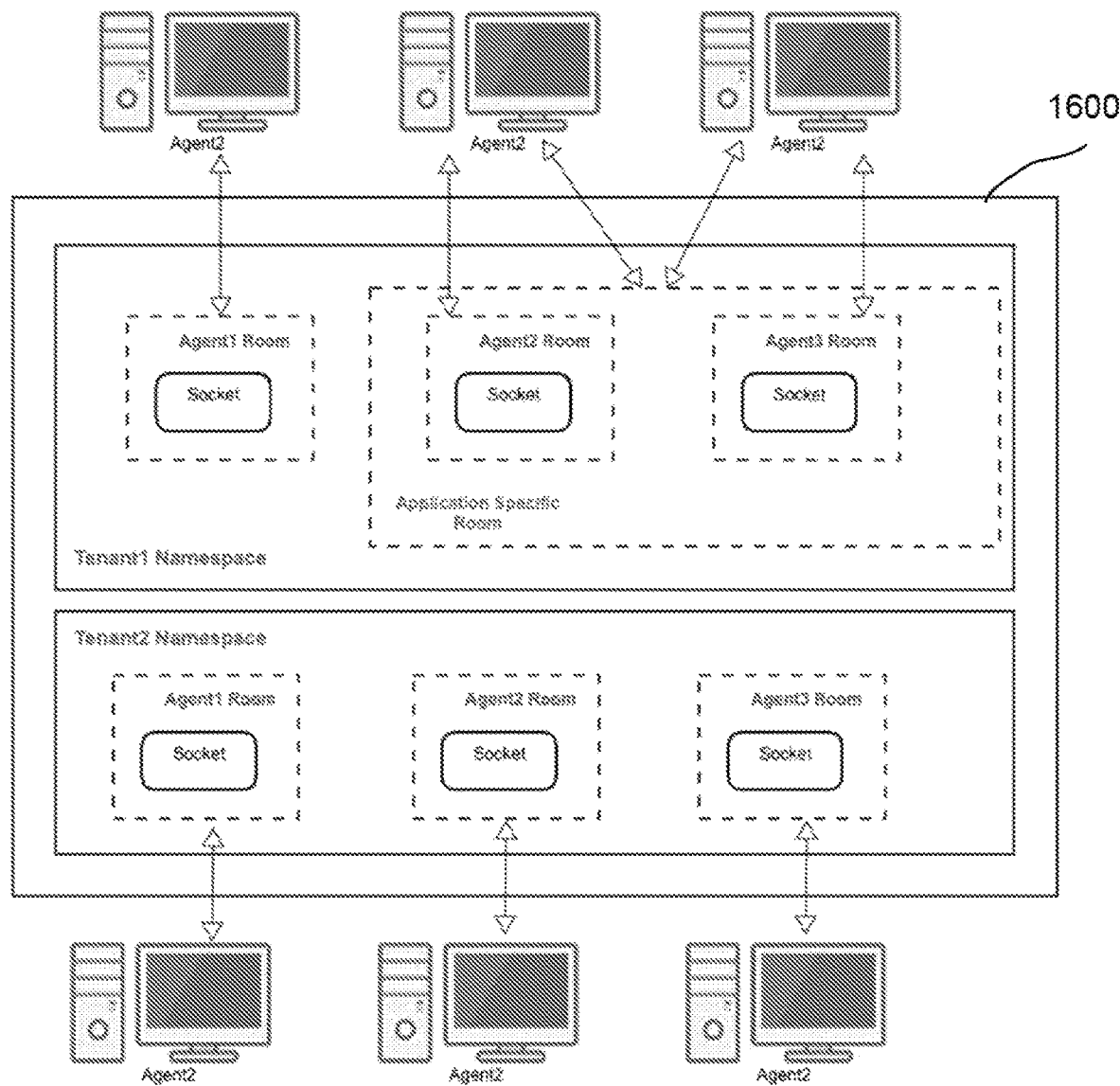
FIG. 16 is a schematic diagram illustrating a client management system that utilizes the Kafka protocol of FIG. 14 to divide notification outputs by application specific rooms within certain tenant areas according to embodiments herein.

The SocketIO server provides the connectivity between the work assist server 208 and the work assist clients 124. Connections may be grouped into SocketIO Namespaces and Rooms. This grouping will provide privacy for Agent specific data, while also enabling other data to be shared among groups of Agents. The Work Assist Server's Client Manager Server will store the logical grouping (Rooms) of the WA Clients. Using this store of information, the Client Manager will be able to route incoming events (from the Kafka Consumer) to the desired WA Client connections. New Agent connections will need to register with the Client Manager. The Client Manager will create the Agent Room for receiving the events from the WA Client. The key value used to store the Agent Room will be the Agent ID. The Client Manager will also be able to manage the lifecycle of the Agent Rooms. FIG. 16 shows an overview 1600 of how the Work Assist Server 208 will organize the SocketIO Namespaces and Rooms.

Namespace and Room structure may include:

Tenant Namespace—Provides the top level route and for the SocketIO connections. Each tenant will have a separate Namespace. All WA Clients of a particular tenant will connect to the corresponding tenant namespace. The tenant namespace will prevent client connections sending and receiving data from other tenant clients.

Agent Room—An Agent Room will be created for each authenticated WA Client connection. These Rooms will provide the secure and private communication between the WA System and the Agents. Agent Rooms will be named and identified using the Agent UPN Application Specific Room—There may be instances were a subset of Agents need to be messaged. This can be achieved through creating application specific Rooms.

Notification API 112

Figure 3:
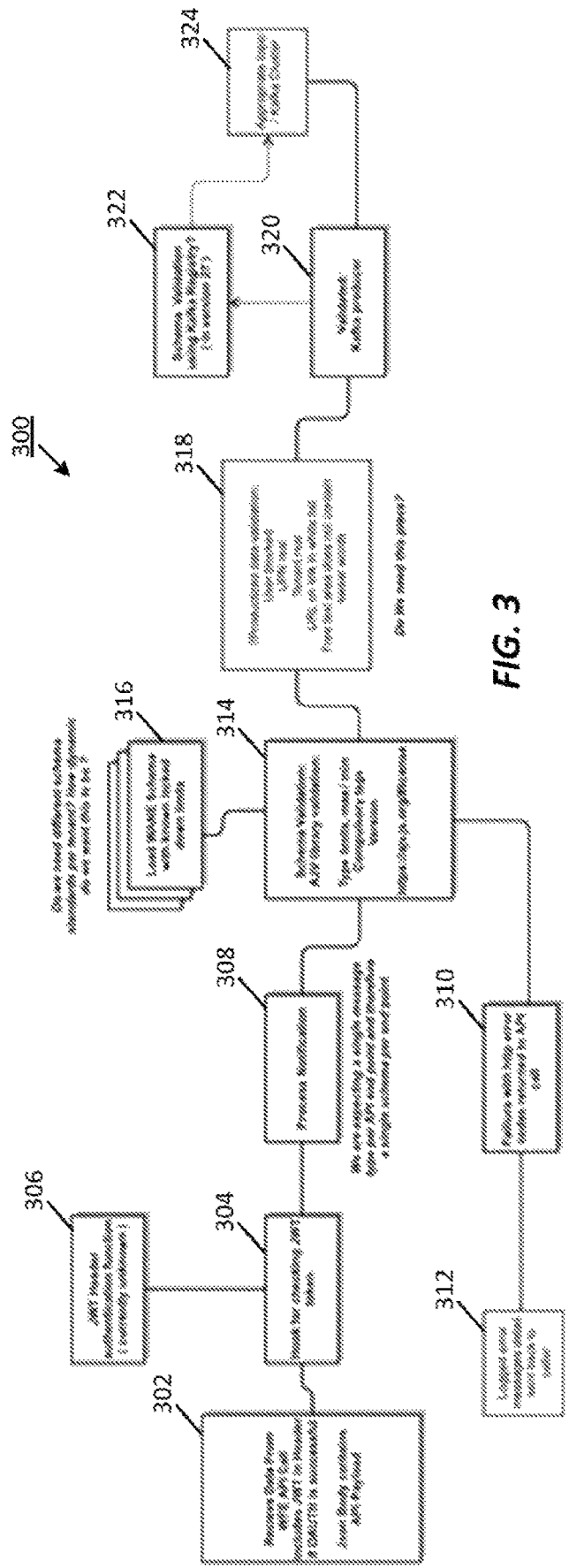
FIG. 3 illustrates the data flow associated with a notification API according to certain embodiments.

Referring to FIG. 3, there is illustrated a description of the data flow 300 associated with the notification API 112 according to certain embodiments. At 302, the notification API 112 receives a message from a source, for example, the recorder integration servers 102 and/or cloud-based recorder server 104. The source of the message includes the authentication token in the header of the message. At 304, the token is checked by the notification API 112. An authentication function 306 is used to perform the check at 304. At 308, the message is processed. The notification API 112 assumes a single message format which is matched against a single schema at 314. The schema itself may be in the form of a JSON file and is loaded up when initializing the library prior to beginning to accept messages. In operation, the library is asked to check each incoming message and responds by giving the message object a pass/fail. For messages that fail validation, the library returns HTTP error codes to the sender at 310, and the library makes available a detailed list of the validation errors found at 312. For example, the message sender may be sent an HTTP error code 400 (BAD REQUEST) to assist in troubleshooting.

At 318, data validation is performed. The notification API 112 may check to determine if the user is blocked, UPN is real, the tenant is real, the URL on a link is on a waitlist, a free text area does not contain any swear words, etc. At 320, the validated data is sent to the managed streaming component 114, which may perform schema validation at 322. Once validated, it is determined that the message is an appropriate topic to be placed into the managed streaming component 114 for further analysis.

Below is an example non-limiting notification payload design. Other notification payload designs consistent with the teaching below are considered to be within the scope of the present disclosure and claims.

```
{
  "upn": "bob@bob.com",
  "title": "Here I am",
  "iconType": "information",
  "message": "How do you do",
  "feedback": {
    "positive": [
      "Good",
      "Great",
      "Excellent"
    ],
    "negative": [
      "Bad",
      "Awful",
      "Terrible"
    ],
    "showFeedback": true
  },
  "actions": {
    "content": [
      {
        "Google": "aHR0cDovL3d3dy5nb29nbGUuY29t"
      },
      {
        "Amazon": "aHR0cHM6Ly93d3cuYW1hem9uLmNvbQ=="
      }
    ],
    "styledAsLinks": true
  },
  "expiryDuration ": 300,
  "highlightedDuration": 30,
  "timeOfEvent": "2021-12-09T11:31:05.442Z",
  "timeEventDetected": "2021-12-09T11:31:06.225Z"
 }
],
"properties": {
 "upn": {
  "$id": "#/properties/upn",
  "type": "string",
  "format": "no-script-string",
  "title": "upn is in an email format.",
  "description": "upn is used to define what user the message goes to.",
  "minLength": 6,
  "maxLength": 255,
  "examples": [
     "hpalumbo0@free.fr"
  ]
 },
 "title": {
  "$id": "#/properties/title",
  "title": "The title of a notification",
  "description": "Title of event for display for message.",
  "type": "string",
  "format": "no-script-string",
  "minLength": 1,
  "maxLength": 255,
  "examples": [
     "Berlin Alexanderplatz"
  ]
 },
 "iconType": {
  "$id": "#/properties/iconType",
  "type": "string",
  'format": "no-script-string",
  "title": "The icon type",
  "description": "Icon type to display on an event.",
  "default": "information",
  "enum": ["information", "confirmation", "error", "warning", "question", "overTalk", "sadFace", "happyFace", "escalation", "clock"],
  "examples": [
     "information"
  ]
 },
 "message": {
  "$id": "#/properties/message",
  "type": "string",
  "format": "no-script-string",
  'title": "The message body",
  "description": "Content message of event to display.",
  "default": "",
  "minLength": 0,
```

```
            "maxLength": 2000,
            "examples": [
                "Cras mi pede, malesuada in, imperdiet et, commodo vulputate, justo."
            ]
        },
        "feedback": {
         "$id": "#/properties/feedback",
         "type": "object",
         "title": "The feedback object",
         "description": "Used to configure the feedback of a notification.",
         "default": { },
         "examples": [
             {
                "feedback": {
                    "positive": [
                        "Good",
                        "Great",
                        "Excellent"
                    ],
                    "negative": [
                        "Bad",
                        "Awful",
                        "Terrible"
                    ],
                    "showFeedback": true
                }
             }
         ],
         "properties": {
             "positive": {
                "$id": "#/properties/positive",
                "type": "array",
                "title": "The positive array",
                "description": "Items that will be displayed as positive items on a notification.",
                "default": [ ],
                "items":
                    {
                        "type": "string",
                        "format": "no-script-string",
                        "minLength": 0,
                        "maxLength": 500
                    }
             },
             "negative": {
                "$id": "#/properties/negative",
                "type": "array",
                'title": "The negative array",
                "description": "Items that will be displayed as negative items on a notification.",
                "default": [ ],
                "items":
                    {
                        "type": "string",
                        "format": "no-script-string",
                        "minLength": 0,
                        "maxLength": 500
                    }
             },
             "showFeedback": {
                "$id": "#/properties/showFeedback",
                "type": "boolean",
                "title": "The showFeedback control",
                "description": "This controls if the up and down feedback buttons are displayed for a notification.",
                "default": true,
                "examples": [
                    false
                ]
             }
         }
        },
        "actions": {
         "$id": "#/properties/actions",
         "type": "object",
         "title": "The actions list",
         "description": "Actions that can be displayed on a notification.",
         "default": { },
         "examples": [
             {
                "actions": {
```

```
        "content": [
          {
            "Google": "aHR0cDovL3d3dy5nb29nbGUuY29t"
          },
          {
            "Amazon": "aHR0cHM6Ly93d3cuYW1hem9uLmNvbQ=="
          }
        ],
        "styledAsLinks": true
      }
    }
  ],
  "properties": {
    "content": {
      "$id": "#/properties/content",
      "type": "array",
      "title": "The content to be listed",
      "description": "Content items that can be displayed on a notification.",
      "default": [ ],
      "items":
        {
          "$id": "#/properties/content/item",
          "type": "object",
          "title": "The content item",
          "description": "Key value pairs of a content item that contains a display name and a base64 encoded URL.",
          "additionalProperties": {
            "type": "string",
            "format": "no-script-string"
          },
          "examples": [
            "{ \"Google\": \"aHR0cDovL3d3dy5nb29nbGUuY29t\" }"
          ]
        }
    },
    "styledAsLinks": {
      "$id": "#/properties/styledAsLinks",
      "type": "boolean",
      "title": "The styledAsLinks controls formatting",
      "description": "Controls if a content item is display as a link (If false item is displayed as a button).",
      "default": false,
      "examples": [
        true
      ]
    }
  }
},
"expiryDuration": {
  "$id": "#/properties/expiryDuration",
  "type": "integer",
  "title": "The expiryDuration value",
  "description": "Length of time (in seconds) after which this message becomes invalid.",
  "default": 30,
  "maximum": 3600,
  "minimum": 1,
  "examples": [
    243
  ]
},
"highlightedDuration": {
  "$id": "#/properties/highlightedDuration",
  "type": "integer",
  "title": "The highlightedDuration value",
  "description": "Length of time (in seconds) to display message on WA client UX.",
  "default": 10,
  "minimum": 1,
  "maximum": 600,
  "examples": [
    35
  ]
},
"timeOfEvent": {
  "$id": "#/properties/timeOfEvent",
  "title": "The timeOfEvent",
  "description": "Date timestamp, UTC time event occurred at Event Producer. If not supplied, the time the API is called will be used",
  "anyOf": [
    {
```

```
          "type": "string",
          "format": "date-time"
        },
        {
          "type": "string",
          "maxLength": 0
        }
      ],
      "examples": [
        "2021-12-09T11:31:05.442Z",
        "2021-12-09 11:31:05",
        "2021-12-09 11:31:05Z",
        "2021-12-09T11:31:05.442+01:00",
        "2021-12-09T11:31:05.442+0100",
        "2021-12-09T11:31:05.442-01:00",
        "2021-12-09T11:31:05.442-0100",
        "2021-12-09 11:31:05+01:00",
        "2021-12-09 11:31:05+0100",
        "2021-12-09 11:31:05-01:00",
        "2021-12-09 11:31:05-0100"
      ]
    },
    "timeEventDetected": {
      "$id": "#/properties/timeEventDetected",
      "title": "The timeEventDetected",
      "description": "Date timestamp, UTC time event was detected at Event Producer.",
      "anyOf": [
        {
          "type": "string",
          "format": "date-time"
        },
        {
          "type": "string",
          "maxLength": 0
        }
      ],
      "examples": [
        "2021-12-09T11:31:05.442Z",
        "2021-12-09 11:31:05",
        "2021-12-09 11:31:05Z",
        "2021-12-09T11:31:05.442+01:00",
        "2021-12-09T11:31:05.442+0100",
        "2021-12-09T11:31:05.442-01:00",
        "2021-12-09T11:31:05.442-0100",
        "2021-12-09 11:31:05+01:00",
        "2021-12-09 11:31:05+0100",
        "2021-12-09 11:31:05-01:00",
        "2021-12-09 11:31:05-0100"
      ]
    }
  }
}
```

Below is an example, non-limiting, structure of the notification API. Other notification API structures consistent with the teaching below are considered to be within the scope of the present disclosure and claims.

```
openapi: 3.0.1
components:
  securitySchemes:
    bearerAuth:
      type: http
      scheme: bearer
      bearerFormat: JWT
  schemas:
    notification:
      type: object
      required:
        - upn
        - title
      properties:
        upn:
          type: string
          description: upn is used to define what user the message goes to.
          minLength: 6
          maxLength: 225
          example: daniela.harvey@techco.com
```

```
                    title:
                       type: string
                       description: Title of event for display for message.
                       minLength: 1
                       maxLength: 255
                       example: Here I am
                    iconType:
                       type: string
                       description: Icon type to display on an event.
                       default: information
                       enum: ['information', 'confirmation', 'error', 'question', 'overTalk', 'sadFace',
'happyFace', 'escalation', 'clock']
                       example: information
                    message:
                       type: string
                       description: Content message of event to display.
                       default: "\"\""
                       minLength: 0
                       maxLength: 2000
                       example: How do you do
                    feedback:
                       type: object
                       description: Used to configure the feedback of a notification.
                       properties:
                          positive:
                             type: array
                             description: Items that will be displayed as positive items on a notification.
                             default: [ ]
                             items:
                                type: string
                             example: ['Good', 'Great', 'Excellent']
                          negative:
                             type: array
                             description: Items that will be displayed as negative items on a notification.
                             default: [ ]
                             items:
                                type: string
                             example: ['Bad', 'Awful', 'Terrible']
                          showFeedback:
                             type: boolean
                             description: This controls if the up and down feedback buttons are displayed for a
notification.
                             default: true
                             example: true
                    actions:
                       type: object
                       description: Actions that can be displayed on a notification.
                       properties:
                          content:
                             type: array
                             items:
                                type: string
                             example:
                                - Google: 'aHR0cDovL3d3dy5nb29nbGUuY29t'
                                - Amazon: 'aHR0CHM6Ly93d3cuYW1hem9uLmNvbQ=='
                             default: [ ]
                          styledAsLinks:
                             type: boolean
                             default: false
                             example: true
                    expiryDuration:
                       type: integer
                       format: int32
                       description: Length of time (in seconds) after which this message becomes invalid.
                       default: 30
                       maximum: 3600
                       minimum: 1
                       example: 300
                    highlightedDuration:
                       type: integer
                       format: int32
                       description: Length of time (in seconds) to display message on WA client UX.
                       default: 10
                       minimum: 1
                       maximum: 600
                       example: 30
```

```yaml
          timeOfEvent:
            type: string
            format: date-time
            description: Date timestamp, UTC time (ISO8601) event occurred at Event Producer. If not supplied, the time the API is called will be used.
            example: "2021-12-09T11:31:05.442Z"
          timeEventDetected:
            type: string
            format: date-time
            description: Date timestamp, UTC time (ISO8601) event was detected at Event Producer.
            example: "2021-12-09T11:31:05.442Z"
info:
  title: Work Assist REST APIs
  description: Service to send notification to Work Assist cloud service.
  version: "2.0"
  termsOfService: https://www.verint.com/our-company/legal-documents/verintcom-terms-of-service/
  license:
    name: Verint Master Customer Agreement
    url: https://www.verint.com/our-company/legal-documents/end-user-license-agreement/
  # Product Code metadata in Verint Connect Developer Portal
  x-vc-product_code: <Put predefined product code metadata for Verint Connect Developer Portal. List of available shortcodes - https://community.verint.com/support/nt/kmp/non-technical---processes/internal/km2244962>
  contact:
    name: API Support
    url: https://community.verint.com/support/
tags:
- name: public
servers:
  - url: https://use1.vcp.verintcloudservices.com/vcp/api/wa/
    description: Verint VCP-US-EAST
  - url: https://apse2.vcp.verintcloudservices.com/vcp/api/wa/
    description: Verint VCP-AU
security:
  - bearerAuth: [ ]
paths:
  /v2/notification:
    post:
      summary: WorkAssist API REST endpoint for sending notifications to WA cloud.
      requestBody:
        required: true
        content:
          application/json:
            schema:
              $ref: '#/components/schemas/notification'
      responses:
        '200':
          description: Ok - message processed.
          content:
            text/html; charset=utf-8:
              schema:
                type: string
        '400':
          description: Bad request - missing message, or schema validation failure.
          content:
            text/html; charset=utf-8:
              schema:
                type: string
        '401':
          description: Unauthorized - permissions issue.
          content:
            text/html; charset=utf-8:
              schema:
                type: string
        '500':
          description: Service unavailable - internal error.
          content:
            text/html; charset=utf-8:
              schema:
                type: string
```

```
        '503':
            description: Service unavailable - internal error.
            content:
                text/html; charset-utf-8:
                    schema:
                        type: string
        tags:
- public
```

Notification Event API Definition

Table 1 below is the notification API definition. In the definition, a Property is an actual event API property. A Source is where the property is added or what is responsible for the property being added before the call is received. Known types are events are internal to the recorder integration server 102 and/or cloud-based recorder server 104, and the appropriate HTML rendering to be displayed can be obtained from within an internal HTML server. Unknown events are events received from an unknown source, and the rendered information is either sent without content translation or can be offloaded to a third party for translation on the fly.

The Notification API 112 adds raw messages to the managed streaming component 114. A streams processor (within the managed streaming component) reviews raw events, validates them and transforms them into processed events stored into a separate processed topic. The processor can include additional business logic using data from other real time events when deciding on the appropriate transform. The events within the processed topic are consumed by the client management system. The Client API uses the events from the client management system to render the events within the user interface (FIG. 3: 318, 320, 322, 324).

TABLE 1

| Property | Source | Description | Example, notes |
| --- | --- | --- | --- |
| Version/Schema | plugin API | Version of event Producer. | this is just the endpoint of the API. Breaking change versions will use new end points |
| UserUPN | Responsibility of calling component | User Principal Name | Format: user.name@tenantCompany.com |
| TenantAuthorization | VCP Authorization token | Unique Tenant token provided by VCP which authenticates call. This can be used by Work Assist (i.e., the real time contextual event notification system 100) internally to attribute the event to the correct tenant | generated dynamically during Azure authentication process |
| EventID | Event producer | a GUID that is produced during initial event generation that can be used to track/log the event individually across the product | |
| SourceID | Derived from XML content: Business logic in Kafka Processor | A known integer that denotes the source of the event. Future Authorized event producers will require their own known SourceID | |

TABLE 1-continued

| Property | Source | Description | Example, notes |
|---|---|---|---|
| MessageType | WFE notification plugin | A known registered type (integer) that denotes the type of event being generated. This Type can be used to display Title, Icon, Heading and Messages for specific internal "known" events via localisation | Maps to a list of known message types and controls look and feel of message |
| SourceLocale | WFO UX | ISO language code. Denotes originating language of source message. | "en-US", "es-MX", "fr-CA" |
| Title | WFO UX | Optional, string. Title of event for display | |
| IconID | WFO UX | Optional. icon ID of event to display | This ID will be one of a fixed list of Icons. If outside the bound of the icon list, the default icon is set |
| Message | WFO UX | Optional. content message of event to display. | User driven content. User is person configuring the notification at customer site |
| Feedback | Kafka Processing | Boolean to denote feedback of some kind | Inferred by feedback lists. Can be property of event in Kafka for simple markup check, but may not be needed within Event API |
| FeedbackOptionsP | WFO UX | Optional. List of Positive Feedback options to be selected | "Thanks", "Accurate", "useful", "Timely" |
| FeedbackOptionsN | WFO UX | Optional. List of negative Feedback options to be selected | "Spam", "Inaccurate", "Annoying", "Late arriving" |
| ButtonList | WFO UX | Optional. List of text to be displayed on work assist UX as buttons on message Clicking the button will attempt a new browser window open at appropriate ButtonURL | "abort", "retry", "cancel" If Work Assist is built as DPA compliant application, then DPA could fire triggers based on the buttons clicked as a cheap method of feedback and performing desktop actions |
| ButtonUrlList | WFO UX | Optional. List of target URLs to be available as buttons on work assist UX [Subject to whitelist] | "http://blah1", "http://blah2", "http://blah3", White listing within cloud configuration, although limited script injection validation is handled internally |
| ButtonAsLink | WFO UX | Boolean. Optional checkbox. | Allows render of buttons as html link instead of button |

TABLE 1-continued

| Property | Source | Description | Example, notes |
|---|---|---|---|
| ExpiryTime | Event Producer | Number of seconds that elapse after which the event is irrelevant | |
| Duration | Event Producer | number of seconds the event may be displayed prominently on UX | |
| TimeOfEvent | Event Producer | datetimestamp, UTC time event occurred | Some detection systems might be able to distinguish between the time the event happened and the time the event was actually detected. Other systems may report the same time for both of these properties |
| TimeEventDetected | Event Producer | datetimestamp, UTC time event was detected | |
| EventUTCOffSet | Event Producer | Timezone offset for the device where the event was detected | |
| TimeEventReceived | Work Assist API | datetimestamp, UTC time event was received by Work Assist | If this is the API facing WFE or third parties, then this event received timestamp is generated by the Work Assist server at the time it receives the API call from WFE. |
| EventPayload | Event Producer | XML source of original payload | full XML payload could be large. In initial design, the payload is sent to kafka for parsing rather than parsed within WFE notification |

Managed Streaming Component 114

The managed streaming component 114 is a distributed data store optimized for ingesting and processing streaming data in real time. Streaming data is data that is continuously generated by the sources (for example, 102 and 104), which typically send the data simultaneously. The managed streaming component 114 processes this data and provides the functionalities of publishing and subscribing to streams of records, storing streams of records in the order in which the records were generated, and processing the streams of records in real time. The managed streaming component 114 combines messaging, storage, and stream processing to allow storage and analysis of both historical and real time data.

Client Management System (CMS) 120

The client management system 120 is responsible for delivering the messages provided by topic to the client application 126. The Client Management System (CMS) 120 is a client package operating on a computer or a client management server that exposes a client API 127 designed to wrap around Socket IO to interact with the managed streaming component 114 to receive/send events. FIG. 4 illustrates a work-flow of the components within the CMS 120 that are communicating with each other according to certain embodiments. FIG. 5 illustrates a general call flow diagram of communication between the notification application executing on the client 124 and Socket.IO Server 411 on the CMS 120 that is shown in FIG. 4 as part of the work-flow according to certain embodiments.

As shown in FIG. 4, the CMS 120 is responsible for consuming events from the managed streaming component topic, sending the events to the appropriate room 408, receiving feedback messages from room 408 as feedback data, and sending feedback messages to the topic, as shown in the sequences of FIG. 4. As shown in FIG. 4, the general work-flow is as follows. Events are delivered to a consumer 404 of the CMS 120 from the managed streaming component 114 related to a topic 402. The consumed events are forward to a client manager 406 (for example, the Socket.IO Server 411) that forwards events to the appropriate client application 126a, 126b, 126n using a respective Socket.IO Client 413a, 413b, 413n. The events may be delivered using a JavaScript version of web socket connection API 412 directed to individual clients. Other languages noted herein may be used. The CMS 120 will also take feedback messages from the clients 124a, 124b, 124n to deliver to the topic.

The client manager 406 maintains the list of rooms 408 (i.e., connections 413a, 413b, 413n). The client manager 406 stores the rooms 408 and uses this store of information to route incoming events (from the consumer 404) to the desired connections 410. New connections register with client manager 406 and the client manager 406 will create a room 408 for receiving the events from the clients 124a, 124b, 124n. An Agent ID value is used to store information in room 408. The client manager 406 also manages the lifecycle of the room 408. Each room 408 is responsible for the Socket.IO connection with its respective client 124a, 124b, 124n and contains functionality to send and receive the events from the client 124a, 124b, 124n.

FIG. 5 illustrates how the webs socket connection API 412 will be situated and used for the various use cases for sending and receiving messages from the Socket IO Server according to certain embodiments. The following general structure may be applied to message objects:

```
{
  string? apiVersion,
  string timestamp,
  object? data, <- where its contents differ from other message types
  object? error
}
```

Event types may be as follows:
From the RIS 204:
  i. WorkAssist Messages aka Mentoring Tips aka Notifications=>eventType: 'notificationEvent',
  ii. Call Start/End/Update=>eventType: 'callEvent',
From the client 124
  iii. Feedback=>eventType: 'feedbackEvent', Below is a non-limiting example message format definition. Other message format definitions consistent with the teaching below are considered to be within the scope of the present disclosure and claims.

```
{
Required: title,upn
upn:
    string minLength:6 maxLength:225
upn is used to define what user the message goes to.
example: daniela.harvey@techco.com
title:
    string minLength: 1 maxLength:255
    Title of event for display for message.
example: Here I am
iconType:
    string
Icon type to display on an event.
Default: information
Enum: information, confirmation, error, question, overTalk, sadFace,
happyFace, escalation,
clock
example: information
message:
    string maxLength:2000
Content message of event to display.
Default: ""
example: How do you do
feedback:
    {
Used to configure the feedback of a notification.
positive:
[
Items that will be displayed as positive items on a notification.
string
]
example: Good, Great, Excellent
negative:
[
Items that will be displayed as negative items on a notification.
string
]
example: Bad, Awful, Terrible
showFeedback:
    boolean
This controls if the up and down feedback buttons are displayed for a notification.
Default: true
example: true
}
actions:
    {
Actions that can be displayed on a notification.
content:
[
string
]
```

```
example: [object Object],[object Object]
styledAsLinks:
    boolean
example: true
}
expiryDuration:
    integer (int32) minimum:1 maximum:3600
Length of time (in seconds) after which this message becomes invalid.
example: 300
highlightedDuration:
    integer (int32) minimum:1 maximum:600
Length of time (in seconds) to display message on WA client UX.
example: 30
timeOfEvent:
    string (date-time)
Date timestamp, UTC time (ISO8601) event occurred at Event Producer.
If not supplied, thetime the API is called will be used.
example: 2021-12-09T11:31:05.442Z
timeEventDetected:
    string (date-time)
Date timestamp, UTC time (ISO8601) event was detected at Event Producer.
example: 2021-12-09T11:31:05.442Z
}
```

Below is a non-limiting example message format. Other notification message formats consistent with the teaching below are considered to be within the scope of the present disclosure and claims.

```
{
"upn": "Benjamin.Keeling15@gmail.com",
"title": "Liaison AI Metal Cambridgeshire International",
"iconType": "sadFace",
"message": "Outdoors haptic connect Music Web Graphic Iowa infomediaries Aruban synthesize",
"feedback": {
"positive": [
"harness",
"XSS",
"Peru",
"RAM",
"next-generation",
"Yen"
],
"negative": [
"invoice",
"Uruguay",
"Tasty",
"Berkshire",
"Tasty",
"process"
],
"showFeedback": true
},
"actions": {
"content": [
{
"navigate": "aHR0cDovL3JvZG9sZm8ub3Jn"
},
{
"Amazon2": "aHR0cHM6Ly93d3cuYW1hem9uLmNvbQ=="
},
{
"Cambridgeshire": "aHR0cDovL2pveS5jb20="
},
{
"Goggle": "aHR0cDovL3d3dy5nb29nbGUuY29t"
}
],
```

```
"styledAsLinks": true
},
"expiryDuration": 564,
"highlightedDuration": 33,
"timeOfEvent": "2022-02-02T17:31:36.619Z",
"timeEventDetected": "2022-02-02T17:31:56.619Z"
}
```

Client Application 126

The client application 126 may include a wrapper built using, for example, the Electron chromium browser application and a React JavaScript application. As such, the client application 126 may be cross-platform and may run on various different clients 124 having different operating systems, display areas, and processors, so long as they are capable of executing a browser application. The wrapper provides operating system functionality, such as, always in focus, 'stickyness' and pass through to system notifications when minimized. The React application inside the wrapper is structured by defining components, such as screen components, user interface (UI) components and atom components. The screen components define the visible page that is displayed to an end-user (src/pages). The UI components are the building blocks of the displayed pages (src/components). The atom components are simple components not specific to event notification (src/components/atoms).

Screen Components

The screen components are components of the client application 126, which uses the various UI components as building blocks to build the screens the user sees and interacts with. An example definition is as follows:

```
 1 wa-client-app/
 2 ...
 3 src/
 4 ...
 5 pages/
 6 CallMentoring.jsx - Screen where the user can receive mentoring messages
 7 NotFound.jsx - Not found Screen
 8 index.js
 9 App.css - General app styles
10 App.js - App Component
11 UnauthenticatedApp.js - App for visitors
12 AuthenticatedApp.js - App for loggedin users
13 index.js - Where the React SPA is loaded
14 ...
```

Figure 6:
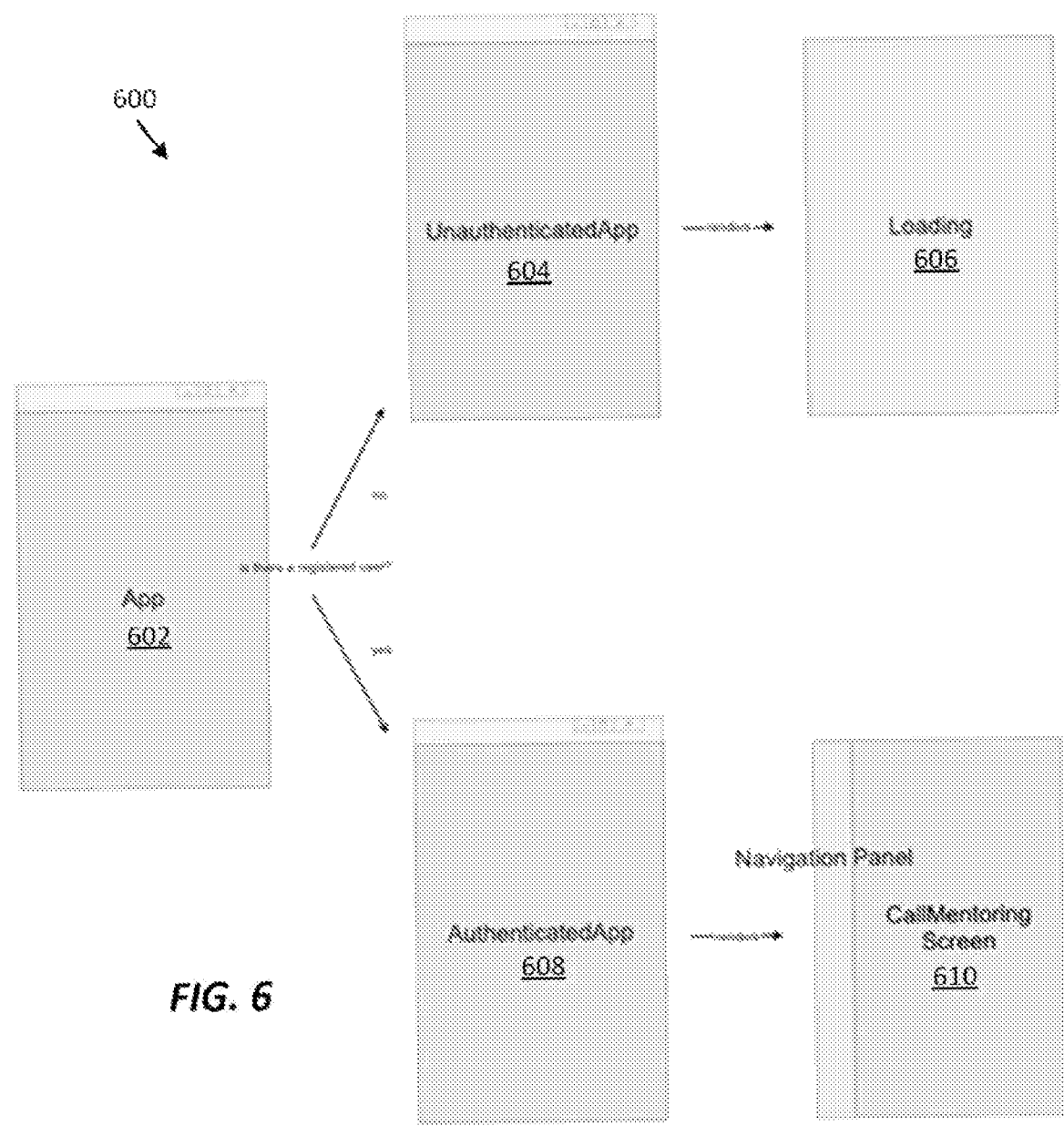
FIG. 6 illustrates an overview of the components within a client user interface according to certain embodiments.

Below is a hierarchy of the execution of the definition.
1. App: display a version of the app whether there is an authenticated user or not
2. UnauthenticaedApp—the app for unauthenticated users
3. LoginRedirect—displays a loading screen and redirects to MS authentication
4. Logout—displays a loading screen, cleans the user and redirects to main screen
5. AuthenticatedApp—the app for authenticated users
6. NavigationPanel—displays the available pages/screens
7. LogoutButton—displays a button that redirects the user to the MS Logout page
8. Avatar—displays the user profile image or a generated one or a default one
9. AppRoutes—displays the selected page/screen
10. <screen>—displays the selected page/screen Screen Components FIG. 6 illustrates an overview of the components within a client user interface 600 according to certain embodiments. Examples of the client user interface are shown in FIGS. 8A and 8B according to certain embodiments. An App component 602 loads either an AuthenticatedApp 608 or UnauthenticatedApp 604 component, in accordance with whether the user is authenticated or not.

```
1// App.jsx (adapted)
2import { useUser } from './context/user-context';
3
4function App( ) {
5         return user ?
6              <AuthenticatedApp user={user} />
7          :
8              <UnauthenticatedApp />;
9}
```

The UnauthenticatedApp 604 shows a login screen (Loading 606) that uses a login component so the user can gain access to the real time contextual event notification system 100. The AuthenticatedApp 608 will load the services available to an authenticated user (for example, an AppRoutes module). The AppRoutes module loads the CallMentoring screen 610 (see FIG. 8A, 8B) of the real time contextual event notification system. This hierarchy allows for future iterations to contain more services and more screens.

The CallMentoring screen 610 is where notifications are displayed and managed by a support agent or other end-user.
 1—CallMentoring:
 2—CallStatus: Displays a greeting or the callerNumber and the callTime
 3. Timer: Displays a time counter, that ticks every second.
 4—MessageList: Displays a list of messages
 5*Message: Displays one message
 6. FeedbackBar: Displays the 'form' that allows the user to send feedback about the received message
 7. FeedbackButton: Either displays a simple button, or a button that opens up a feedback dialog User Interface Components Below are the building blocks of the user interface.

```
...
src/
components/ - React components folder
Authentication/
LogoutButton.jsx
Call/
Errors/
Feedback/
Layout/
Messages/
index.js
...
```

Figure 9A:
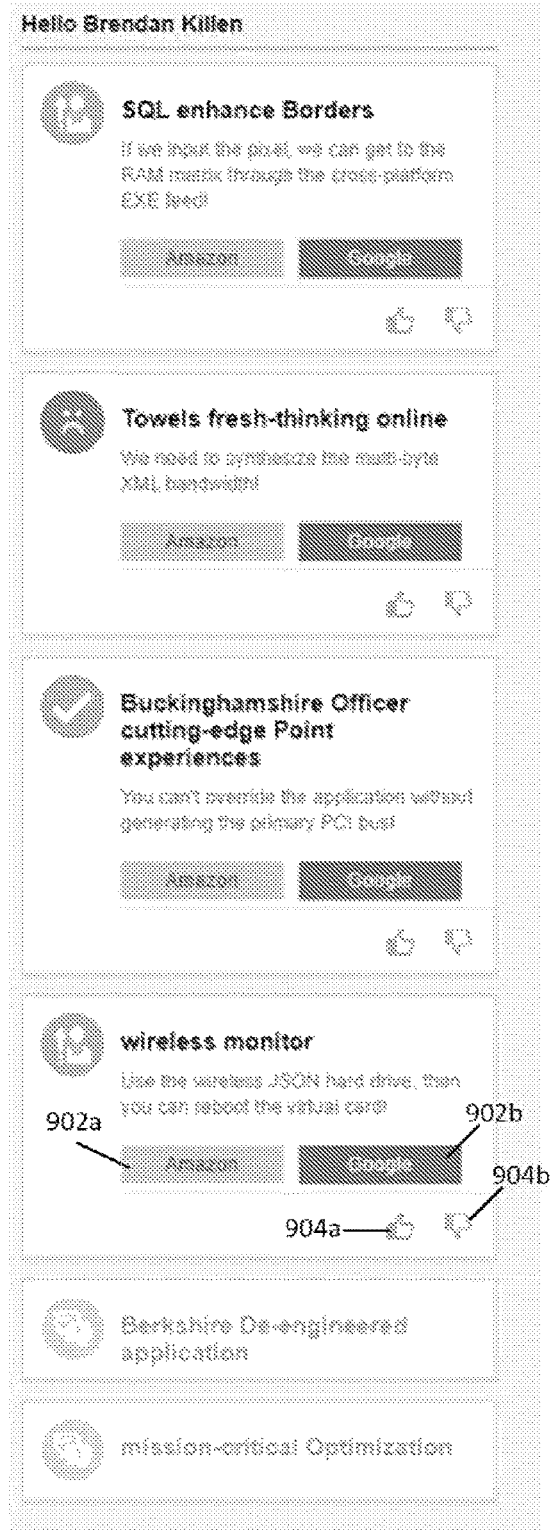
FIG. 9A illustrates an example user interface of the client application according to certain embodiments.
Figure 9B:
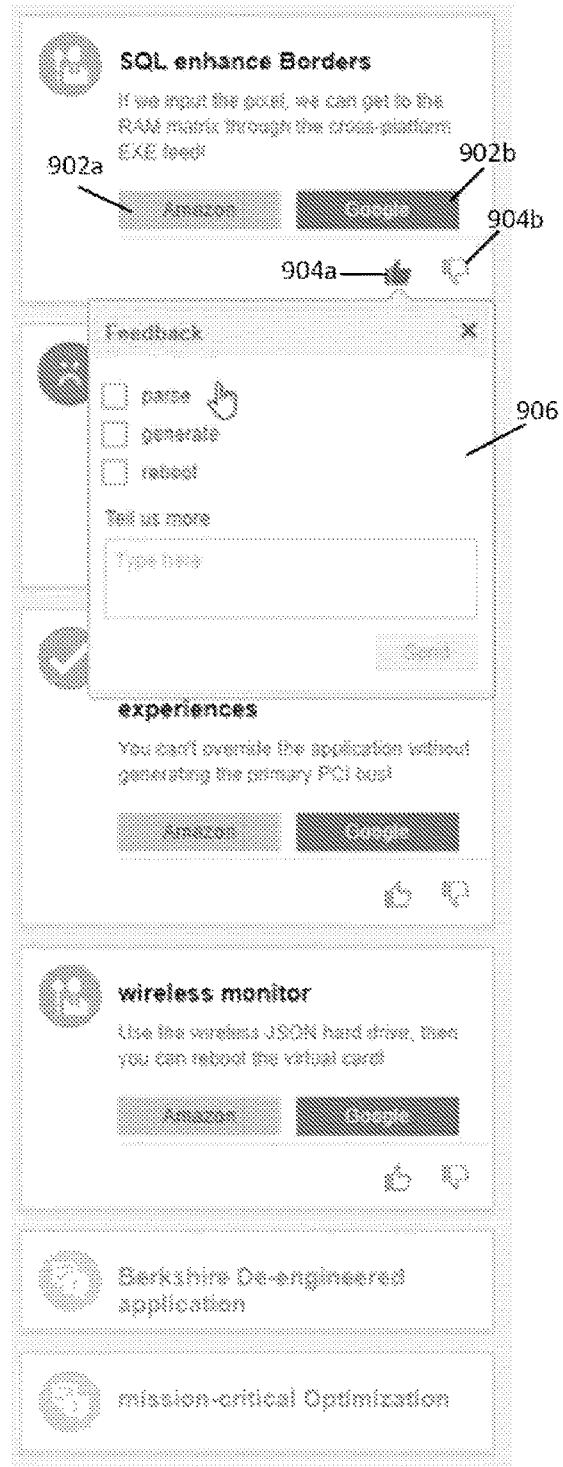
FIG. 9B illustrates an example user interface of the client application according to certain embodiments.

FIGS. 7, 8A, and 8B illustrate example user interface elements that populate the user interface of the client application 126 according to certain embodiments. FIGS. 9A and 9B illustrate an example user interface of the client application 126. FIG. 7 illustrates example icons that may be used to convey real time contextual event messages according to certain embodiments. The icons are provided to enable the support agent to quickly identify a frame of reference for the displayed notification message. FIGS. 8A and 8B illustrate example notifications that may be presented in the user interface of the client application 126. The notifications utilize one of the icons of FIG. 7 together with a title (for example, Complaint, Long time to respond, Frustrated Customer, etc.) and an explanation or suggestion to the support agent to handle the cause of the notification.

FIG. 9A shows that the notifications may be stacked on top of each other in the user interface according to certain embodiments. The notifications may be closed (shown in gray) after being acted on by the support agent or after a period of time elapses. Buttons 902a, 902b are included such that the support agent may perform another action based on the notification (for example, look up a product at Amazon or Google). The user interface includes voting buttons 904a, 904b to enable the support agent to provide feedback about the notification. As shown in FIG. 9B, when the support agent presses the positive feedback button 904a, a dialog box 906 is displayed to enable the support agent to provide feedback through an action box and/or text box.

Figure 10:
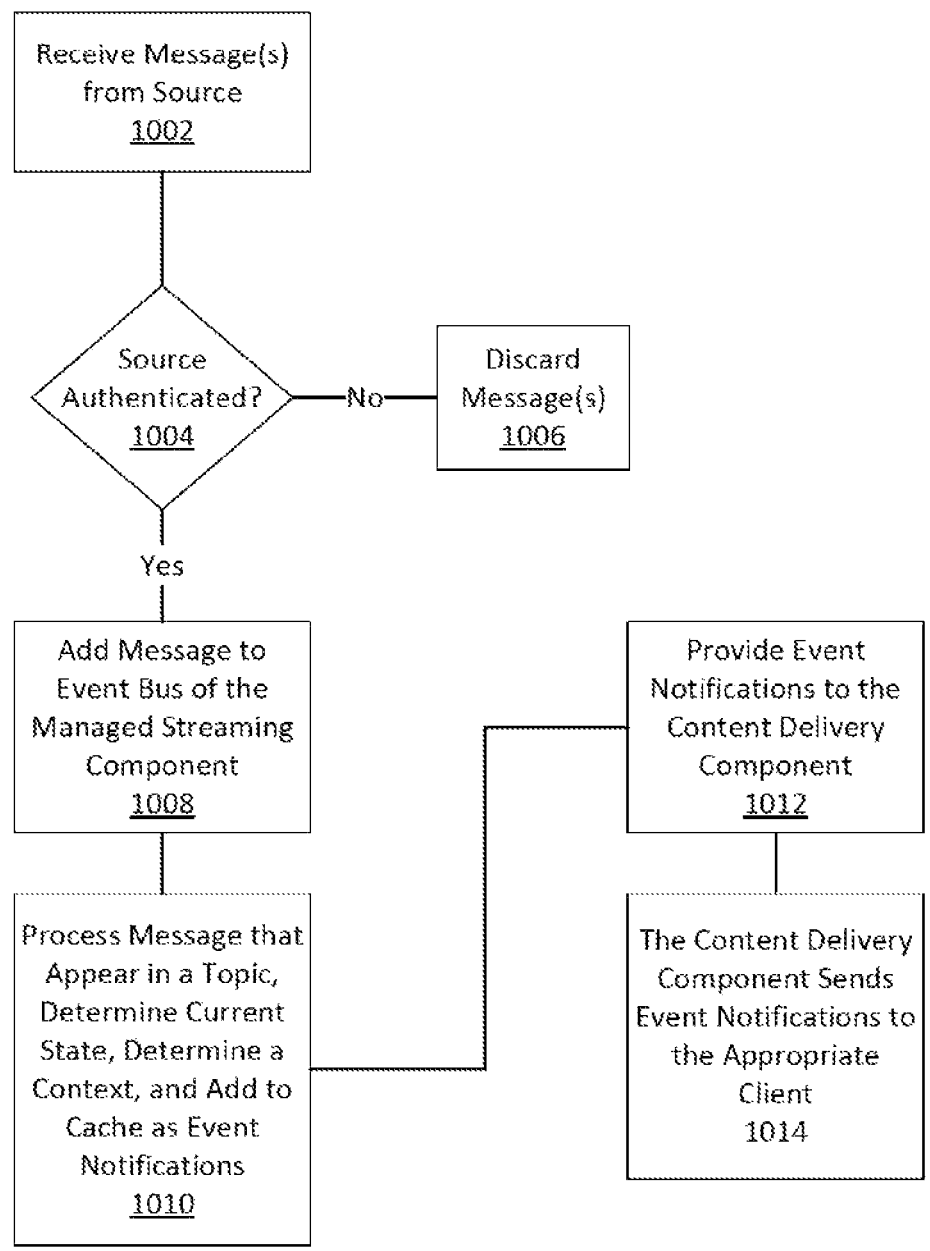
FIG. 10 illustrates an example flow diagram of operations performed by the real time contextual event notification system according to certain embodiments.

FIG. 10 illustrates an example flow diagram of operations performed by the real time contextual event notification system according to certain embodiments. At 1002, messages are received from a source. The recorder integration server 102 and/or cloud-based recorder server 104 send messages to the API gateway component 106 that accepts application programming interface (API) calls over a socket connection from the recorder integration server 102 and/or cloud-based recorder server 104.

At 1004, it is determined if the received message is authenticated. The messages included the token provided by the authentication component 108 and the RMS 110. If the message is not authenticated, it is discarded at 1006. If the message is authenticated, then at 1008, it is added to a message bus of the managed streaming component 114. Authenticated messages are forwarded from the API gateway component 106 to the notification API 112 that provides a RESTful API to connect the events to the event bus of the managed streaming component 114.

At 1010, the authenticated, received message is processed, a current state is determined, and it is added to a cache. The managed streaming component 114 processes messages that appear in the raw topic determine the current state of the call using the incoming events, determines a context (the state of the recipient and the circumstances that generated the notification) and updates/adds to the cache 116 with the most current event of the call(s), and adds event notifications to the processed topic as notification event(s) for consumption by the client management system (CMS) 120.

At 1012, the event notifications are provided to the CMS 120. The CMS consumes the notification event(s) and determines which attached client is the target for the message. At 1014, the CMS 120 sends the notification event(s) to the appropriate client that is the target the message. The CMS 120 is an API designed to wrap around Socket IO for the handling of the socket to setup easy-to-use commands to interact with the system 100 to receive/send events. The notification is presented in a user interface that is delivered by the content delivery component 122. The content delivery component 122 may be provided as JavaScript libraries that are interpreted by a plugin on a client application 126 (for example, a browser) executing on the client 124 to render the user interface. Target users connect to the real time contextual event notification system 100 via a web application hosted in a native browser or desktop electron application.

Figure 11:
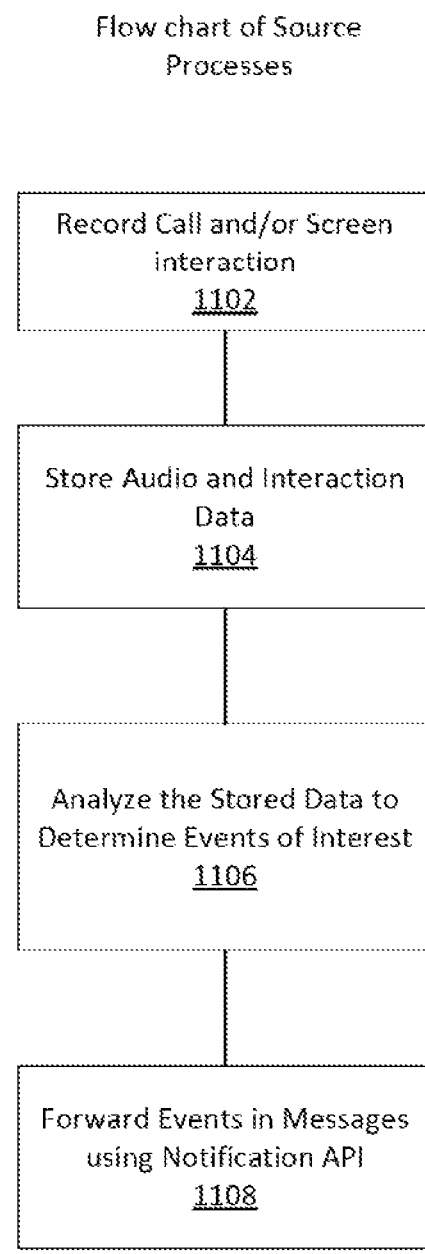
FIG. 11 illustrates an example flow diagram of operations performed by a source of data that is provided to the real time contextual event notification system according to certain embodiments.

FIG. 11 illustrates an example flow diagram of operations performed by a source of data that is provided to the real time contextual event notification system according to certain embodiments.

At 1102, the source records call and/or screen interactions between, for example, a customer and a support agent. As a customer conducts a voice communication session with an agent, the call recorder 202 records audio and screen interaction data to enable search, replay, and report on calls by topic. At 1104, the audio and interaction data is stored. The data may be stored at a Recording Archive Server (RAS) 206.

At 1106, the stored data is analyzed to determine events of interest. The real time analytics framework 210 may determine analytics events that are derived from acoustic analytics, linguistic analytics (for example, keywords and sentiment analysis from transcripts), biometric analytics (for example, does the person on the phone match a voice print), and desktop analytics. At 1108, the events are forwarded using the notification API. A call may be made by the RAS 206 to the RMS 110, which is the endpoint for the socket.IO connections from the recorder integration servers 102 and/or cloud-based recorder server 104.

Figure 12:
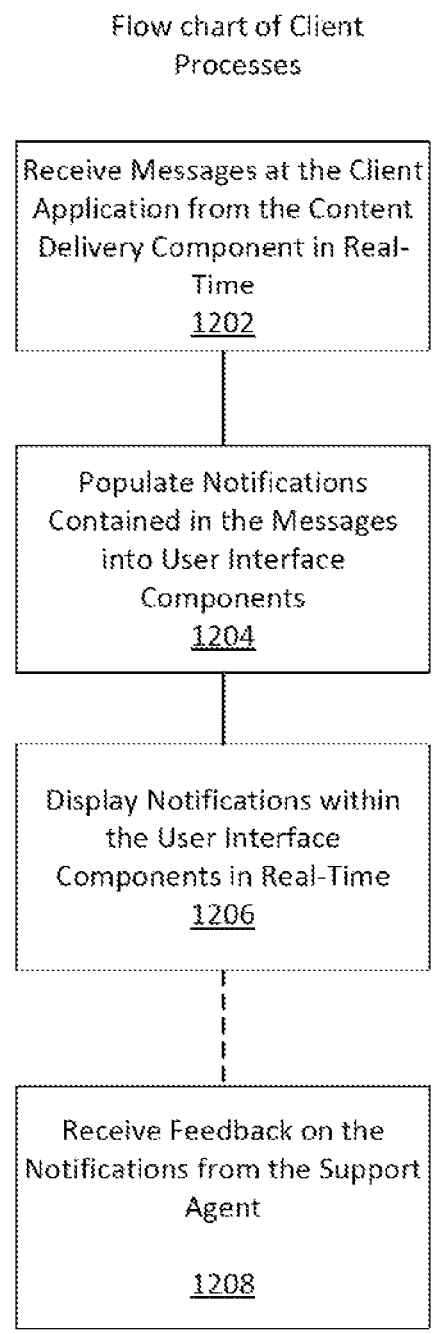
FIG. 12 illustrates an example flow diagram of operations performed by a client that receives targeted notifications from the real time contextual event notification system according to certain embodiments.

FIG. 12 illustrates an example flow diagram of operations performed by a client that receives targeted notifications from the real time contextual event notification system according to certain embodiments.

At 1202, messages are received by the client application from the CMS in real time. The events are delivered to the client application 126 using the client API 412. At 1204, the notifications are populated into user interface components and at 1206, the notifications are displayed in the user interface. The client application 126 defines screen components, one of which is the CallMentoring screen 610 where notifications are displayed and managed by a support agent or other end-user.

Optionally or additionally at 1208, feedback on the notification from the support agent is received by the CMS. The user interface may include voting buttons 904a, 904b to enable the support agent to provide feedback about the notification.

Example Use Cases

The Send events to work Assist desktop clients for notification of generated events from WFE/foundation notifications framework Send events to Work Assist desktop clients for notification of generated events from third-party event sources.

Figure 13:
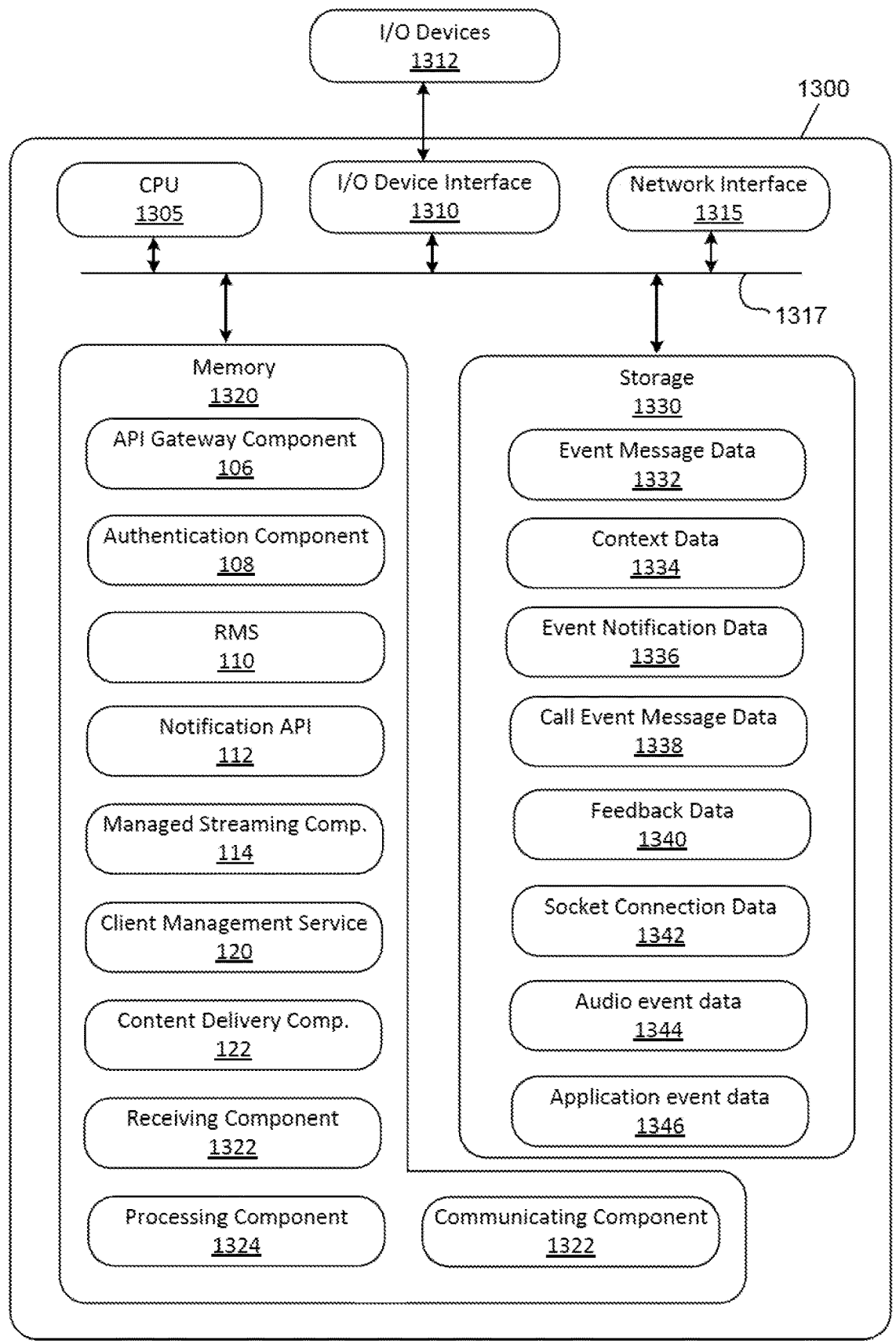
FIG. 13 is a schematic diagram of computer hardware that may be utilized to implement event notification processing in accordance with the disclosure according to certain embodiments.

FIG. 13 illustrates examples of computers 1300 that may include the kinds of software programs, data stores, and hardware that can implement event message processing, context determination, notification generation, and content delivery, as described above according to certain embodiments. As shown, the computing system 1300 includes, without limitation, a central processing unit (CPU) 1305, a network interface 1315, a memory 1320, and storage 1330, each connected to a bus 1317. The computing system 1300 may also include an I/O device interface 1310 connecting I/O devices 1312 (e.g., keyboard, display and mouse devices) to the computing system 1300. Further, the computing elements shown in computing system 1300 may correspond to a physical computing system (e.g., a system in a data center) or may be a virtual computing instance executing within a computing cloud. Other components include a data receiving component 1322, a data processing component 1324, a socket connection data component 1342, an audio event data component 1344, and an application event data component 1346.

The CPU 1305 retrieves and executes programming instructions stored in the memory 1320 as well as stored in the storage 1330. The bus 1317 is used to transmit programming instructions and application data between the CPU 1305, I/O device interface 1310, storage 1330, network interface 1315, and memory 1320. Note, CPU 1305 is included to be representative of a single CPU, multiple CPUs, a single CPU having multiple processing cores, and the like, and the memory 1320 is generally included to be representative of a random access memory. The storage 1330 may be a disk drive or flash storage device. Although shown as a single unit, the storage 1330 may be a combination of fixed and/or removable storage devices, such as fixed disc drives, removable memory cards, optical storage, network attached storage (NAS), or a storage area-network (SAN).

Illustratively, the memory 1320 includes an API gateway component 106, an authentication component 108, a recorder management system 110, a notification API 112, a managed streaming component 114, a client management system 114, and a content delivery component 122, all of which are discussed in greater detail above. Further, storage 1330 includes, event message data 1332, context data 1334, event notification data 1336, call event message data 1338, and feedback data 1340, all of which are also discussed in greater detail above.

Authentication

Figure 14A:
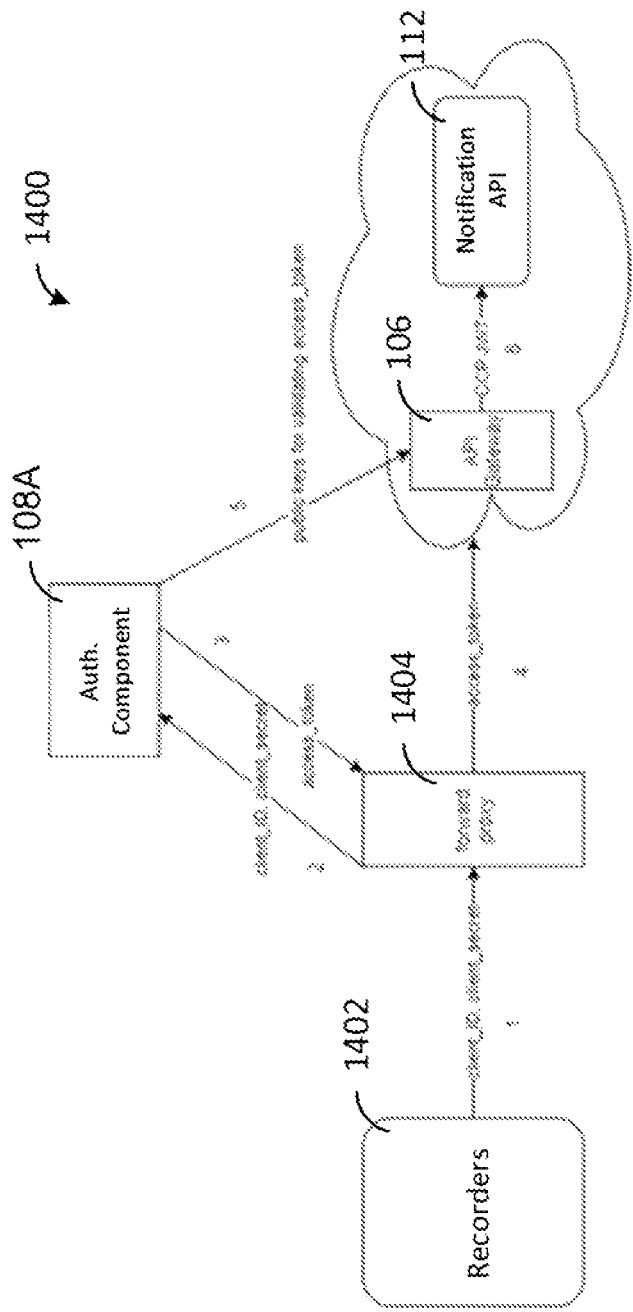
FIG. 14A is a block diagram of an authentication architecture for authenticating an API call, according to certain embodiments.
Figure 14B:
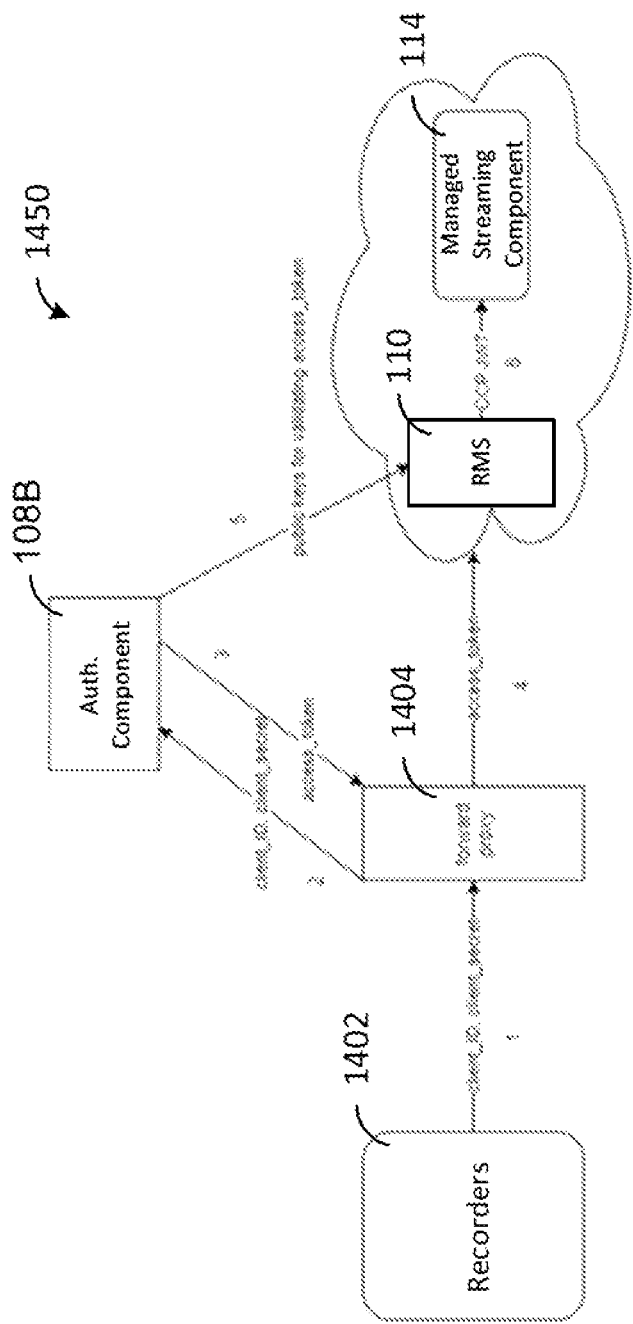
FIG. 14B is a block diagram of an authentication architecture for authenticating a persistent web socket connection, according to certain embodiments.
Figure 14:
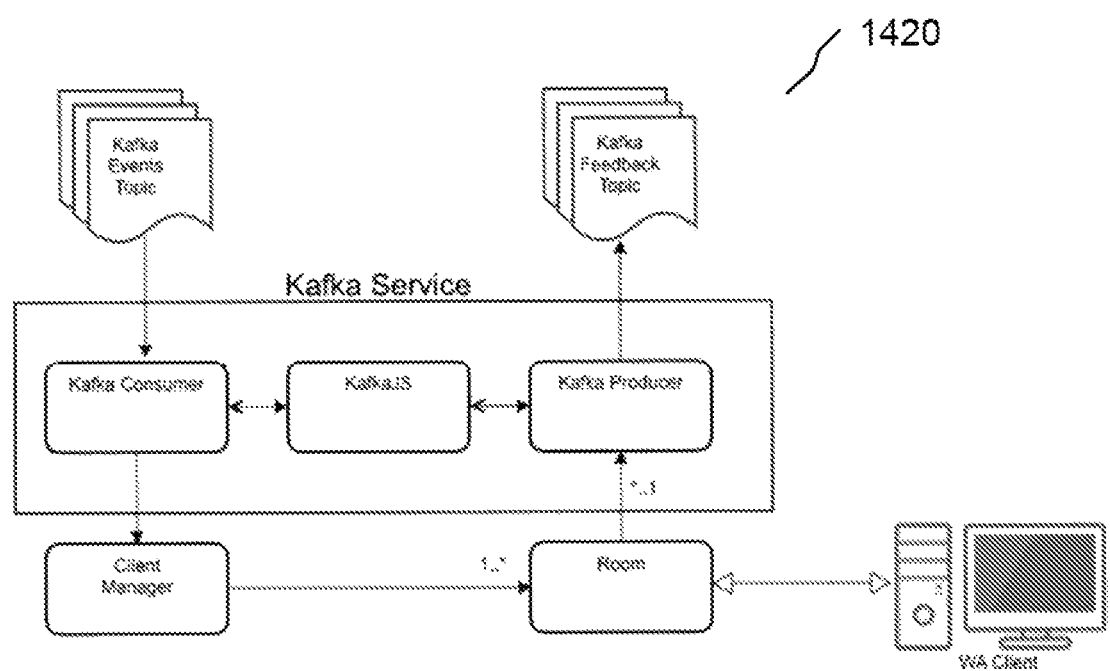
FIG. 14C is a schematic diagram illustrating one example embodiment of a streaming data service implemented in a Kafka protocol to deliver notifications to end user client devices.

Referring generally to FIGS. 14A and 14B, block diagrams illustrating different configurations of an authentication architecture are shown, according to some embodiments. FIG. 14A, in particular, shows an authentication architecture 1400 for authenticating RESTful API calls, whereas FIG. 14B shows an authentication architecture 1450 for authenticating persistent web socket connections (e.g., as discussed above with respect to FIG. 2). Broadly, architecture 1400 represents a structure of components and a flow of data for authenticating incoming connections. To this point, architecture 1400 is generally implemented by various components of system 100, including on premises recorder 102 and cloud-based recorder server 104 (herein generally referred to as recorders 1402), API gateway component 106, authentication components 108A/108B, RMS 110, and/or notification API 112.

At a high level, architectures 1400/1450 represent a "Daemon flow" authentication architecture. In some embodiments, identification data for one of recorders 1402 is authenticated using Daemon flow authentication via authentication component 108, which generates an access token and corresponding validation keys. Subsequently, an API call (e.g., including the access token) can then be validated by API gateway component 106 such that recorders 1402 can transmit event data to notification API 112. Additionally, or alternatively, a connected persistent web socket connection (e.g., Socket.io connection) can be authenticated using the aforementioned Daemon flow authentication architecture (e.g., architecture 1450) via RMS 110. In such embodiments, as described above, RAS 206 can create a socket connection to the RMS 110 which is authenticated as shown in FIG. 14B, described in greater detail below.

Taking a more granular look at FIG. 14A, recorders 1402 are shown to provide a public identifier (client_id) and a secret or password (client_secret) to a forward proxy 1404 (1). As described herein, forward proxy 1404 may be a component of recorders 1402 or API gateway component 106, or forward proxy 1404 is hosted by another computing device (e.g., another server). Alternatively, in FIG. 14B, forward proxy 1404 may be a component of RMS 110, as discussed below. Forward proxy 1404 is shown to transmit client_id and client_secret to authentication component 108 (2), where the public identifier and secret are authenticated using the aforementioned Daemon flow authentication. Subsequently, authentication component 108 may generate a Daemon flow access token (access_token), which is transmitted back to forward proxy 1404 (3). Authentication component 108 may also generate and transmit public keys for validating the access token to API gateway component 106 (5). As described herein, public keys and/or access tokens are cryptograms, often comprising strings of characters (e.g., numbers, letters, symbols), that are used for secure access and authentication of remote systems and devices.

As shown, API gateway component 106 may also receive access_token from forward proxy 1404, either before, after, or concurrently with the public keys. Thus, once both the access_token and public keys are received, API gateway component 106 can validate the access_token to permit the API call. Once validated, API gateway component 106 may transmit data to notification API 112 (6). From there, notification API 112 can pass event data to managed streaming component 114. In some embodiments, event data includes application, linguistic, or acoustic events, as described in greater detail below. For example, recorders 1402 may obtain linguistic and acoustic data and may subsequently transmit the linguistic and acoustic data to notification API 112 via architecture 1400. In another example, recorders 1402 may detect linguistic and/or acoustic events, such as during a phone call between a customer and a support agent and may transmit the detect event data to notification API 112 via architecture 1400.

Turning now to FIG. 14B, architecture 1450 is shown to be broadly similar to architecture 1400. For example, architecture 1450 includes recorders 1402, forward proxy 1404, and authentication component 108, which function as described above. In this regard, architecture 1450 may simply be an alternate configuration of architecture 1400. However, in the configuration of FIG. 14B, architecture 1450 is shown to pass access_token and public keys to RMS 110 rather than API gateway component 106. Accordingly, as mentioned above, architecture 1450 may represent an authentication architecture for persistent web socket connections (e.g., Socket.io). As shown, RMS 110 may communicate directly with managed streaming component 114 (6). In other words, the authentication is supplied by the connection interfacing directly to RMS 110, rather than using API gateway component 106. In general, web socket data can indicate a status of a current interaction for a user, such as a call state. This state data can be used in conjunction with the event data from notification API 112 (e.g., by managed streaming component 114) to generate a processed queue from the raw event queue. To this point, notification API 112 can provide specific event data (e.g., application or linguistic event data) as detected by recorders 1402.

Kafka Service

FIG. 14C illustrates one example embodiment of a work assist server 208 utilizing a Kafka service 1420 to implement the event notification system 100. Kafka is a commonly used data streaming protocol that allows for message generation as described above and also provides opportunities to use machine learning and artificial intelligence in operations.

The Kafka Service 1420 will be responsible for consuming events from the Kafka Topic, sending the events to the appropriate Room, and receiving feedback messages from the Rooms. In one non-limiting embodiment, the Kafka Service 1420 will use the KafkaJS module to provide a consumer and producer. The Kafka Consumer will be waiting for events from the 'Event Topic'. Upon receipt of an event, the Kafka Consumer will pass the message to the Client Manager for routing. The Kafka Producer will provide an asynchronous interface to deliver events onto the 'Feedback Topic'. Each Room will be responsible for making calls to the Kafka Producer directly. There will be two Kafka Topics. One topic for events and one topic for feedback. The Events Topic will be keyed on Agent UPN. The Feedback topic will be keyed on the "id" (Work Assist Server API). KafkaJS will be used to communicate with the Kafka Topics.

Call State Awareness Data

One example embodiment of this disclosure makes use of call state awareness functions that are summarized in FIG. 2. A call recorder system 202 may use the aforementioned 'Daemon Flow' authentication of FIG. 3 to enable on-premises recorder servers 102 and cloud server installations 104 to send call status information into the Work Assist server 208. As noted above, communications data 150 is sent via socket i/o connections using an underlying web socket connection library. This "always on" connection enables rapid and real-time connectivity from server to regional cloud notification infrastructure. The use of the Daemon flow authentication enables this socket connection to be deployed irrespective of the location of the recorder infrastructure (on-premises or co-located in cloud). The communications data 150, directed from the end user client device 124 to a recorder archive server 206 and on to the work assist server 208, may include particular call status data including but not limited to call from identifiers, call to identifiers, forwarded to and from identifiers, inbound, outbound, answered, active, on hold, ringing, busy, duration, and call back status.

This call status data may be incorporated into the work assist server 208 and used by the event notification system 100 in messages to an end user client device 124. Work Assist Call Event API 138 receives a stream of call events, including call status data, from Recorder Integration Servers (RIS). This event stream is added to the Work Assist cloud instance to allow for recorder context to be used to influence Work Assist notifications, and Work Assist client interface states. A service within Recorder archive server (RAS) 206 has been implemented, which has a mux/demux connection to the RIS, which loads the appropriate services responsible.

Work Assist Call Event API 138 receives an event stream from Recorder Integration Servers (RIS) 204. This event stream is added to the Work Assist cloud instance to allow for recorder context to be used to influence Work Assist notifications, and Work Assist client interface states. This API is bidirectional to enable feedback and control of RIS servers from the Work Assist Client. The WA "Service" lives within the Recorder archive server (RAS) 206 and is registered as a part of the startup sequence of AgentServerService. The purpose of this service is to receive "Interaction" and "Analytics" events for all real time calls within the system, and send them to the WA cloud server via socket.io. When the work assist service starts at the work assist server 208, a list of configured tenants needs to be obtained in order to maintain segregation of data when communicating with the WA socket.io server in the cloud. The list of "current" tenants needs to be "watched" to ensure any newly added tenants can be added seamlessly without the need for restarts. Each tenant will have its own socket.io connection to the WA server on a 1:1 basis.

Each service "watches" configuration to check if Work Assist (WA) is enabled for each tenant present. If WA is enabled, credentials to connect to WA in the cloud (via a configured URL) are obtained (from securitysettings.xml via an RIS API and used to establish a Socket.IO connection per tenant. The most common configuration is that there is a single tenant on each RIS/RAS, but this needs to be flexible.

This service uses the existing notification messages present in the RAS to send all of these to WA for the given tenant. This ensures tenant data segregation at the socket level. Each message that is sent to WA requires a globally unique User Name (UPN used in first instance, User GUID is also possible) in order to identify where the message needs to be displayed. (desktop to work assist server connection association).

In addition to needing the UPN on all messages, the tenant id must also be present so that messages can be sent to the correct tenant Socket.IO connection. All messages in the RAS 206 are sent up to the cloud, and once they have arrived in the cloud, validation protocols filter the messages down before storing them in Kafka. This enables all of the information to be sent out from RAS, even if initial call states implemented are limited by time and cost.

This service handles WA user privilege checks for the short term. This is done via a lookup on the user sent from the work assist server 208 via a Foundation API call. The response will be sent back to WA detailing whether the user has WA privileges or not. In order to ensure the privilege check is sent to the original Socket.IO node that requested a check for privileges, the node that requests the check will need to open a loopback connection to itself, and send the connection details along in the message to RAS. This API is bidirectional to enable feedback and control of RIS servers from the Work Assist Client.

Once the list of tenants are known, the service needs to look for configuration to see if WA is configured. This information will be in the "INTEGRATION_FRAMEWORK-conf.xml" file within the External element. Details

```
1<External>
2    <CloudConfig>
3        <EXT_VCS xmlns="http://www.verint.com/EM/Metadata/2008/Roles/EXT_VCS" role:instanceID="855040" role:roleName="EXT_VCS" role:Identity="211">
4            <EXT_VCS_SETTINGS>
5                <AZURE_AUTH_SCOPE>ws://application/api/auth/.default</AZURE_AUTH_SCOPE>
6                <WA_URL>https://RegionalURL/LoadBalance/Address</WA_URL>
7                <WA_UPN>Username</WA_UPN>
8            </EXT_VCS_SETTINGS>
9        </EXT_VCS>
10   </CloudConfig>
11</External>
```

If the CloudConfig settings required to successfully communicate to WA are not configured for any tenants, the service should not register listeners for notifications (Interactions and Analytics events). One or more should be present to prevent registering for notifications without being able to send them onto the WA cloud server. If any changes are made, and a tenant is added, or configuration is added—a connection should be created/updated and notifications should be registered if necessary.

The CloudConfig settings also contain the required information to pass the VCP Authentication Config to the correct Azure instance. The VCP Authentication Config is parsed from the SecuritySettings.xml file as specified in the linked page above—by obtaining the VCPAuthentication element, decoding it using base 64 URL decoding and then decrypting it using the CCL (AES256) decryption. The VCP Authentication Config is configured on a per tenant basis, which means that each connection to the WA server has its own set of credentials.

When receiving Interaction or Analytics events, a map of Session ID to Tenant IDs is populated from Interaction messages to allow Analytics events that do not have an explicitly set Tenant ID to be sent onward using the correct socket.io connection. This allows a lookup on Analytics events based on the Session ID. This map is cleaned up when receiving a call end interaction message.

Provided a message has a tenant, it is then checked for a user principal name (UPN). If no UPN is present, the message is unable to be sent to a client who is logged into WA and is therefore not sent at all. If a message does have the Tenant ID and the UPN, it is passed to the SocketIoManager in order to be sent to WA using the correct socket.io connection.

The socket input and output manager contains a single executor that queues the work of sending messages via the socket.io connection for a given tenant. On startup, and on configuration refresh, the map of Tenant to socket.io connections are created and the connections themselves are established. Each of these connections requires the configuration from the VCP Authentication Config.

The individual connections managed by the SocketIOManager are contained within SocketIoConnection. These connections directly handle the communication and connection to the RMS. When connecting to the RMS, there is a two phase connection—an initial connection with very basic communication. It listens for events on the following keywords: "Connect", "tenantInformation", "disconnect", "connect_error", "reconnect", "reconnect_attempt" and "event_close". The main purpose of this initial connection is to establish connection to the RMS and receive the "tenantInformation". This is done by the RMS parsing the supplied azure access token, and the RMS responding with a tenant. Once this information has been passed back to the SocketIoConnection, a new namespace socket.io connection is created. Any information sent to the RMS is done via this new tenant based namespace socket.

Authentication

To authenticate requests via the Socket IO channel, the Daemon Flow azure token is be added to the query string in the "handshake.query.access_token". The request connects out to the VCP Network Load Balance (NLB)/Firewall (FW). The NLB validates the token, removes it and in its place, adds a JWT token to be passed onto the back end service.

To generate the azure access token, the Microsoft Authentication Library (MSAL) is used. This will requires the known Daemon flow client/secret provided by an API. See https://docs.microsoft.com/en-us/azure/active-directory/develop/msal-overview #languages-and-frameworks The JWT token is validated inside each back end service. Within the JWT, there are claims for which the tenant id (v_tid), UPN (sub) and type (v_auth) must be specified. The names specified here are those that are used within the on-prem JWT's or the within the cloud implementation for consistency.

TABLE 2

Messages this API will process

| Source | Description | Examples |
|---|---|---|
| Analytics Real-Time API Ref: Analytics Real-Time API | Real-Time Speech Analytics Notifications, 5-10 s Voice Biometrics Notifications | Transcription Notifications Category Match Notifications Audio Quality Notification Voiceprint Match Notifications |
| Integrations Real Time API Ref: Integrations Real Time API | Inbound Call | Alerting Connected Recording Starts Recording Stops Disconnection |
| | Pausing and Resuming Recording | Alerting Connected Recording Starts Pause Recordings Resume Recordings Stop Recordings Start Recordings Disconnection |
| | Blocked Call | Alerting, Connected, Recording Starts Block Recording Disconnection |
| | Attribute Change | A new value appears on an attribute |

Figure 17:
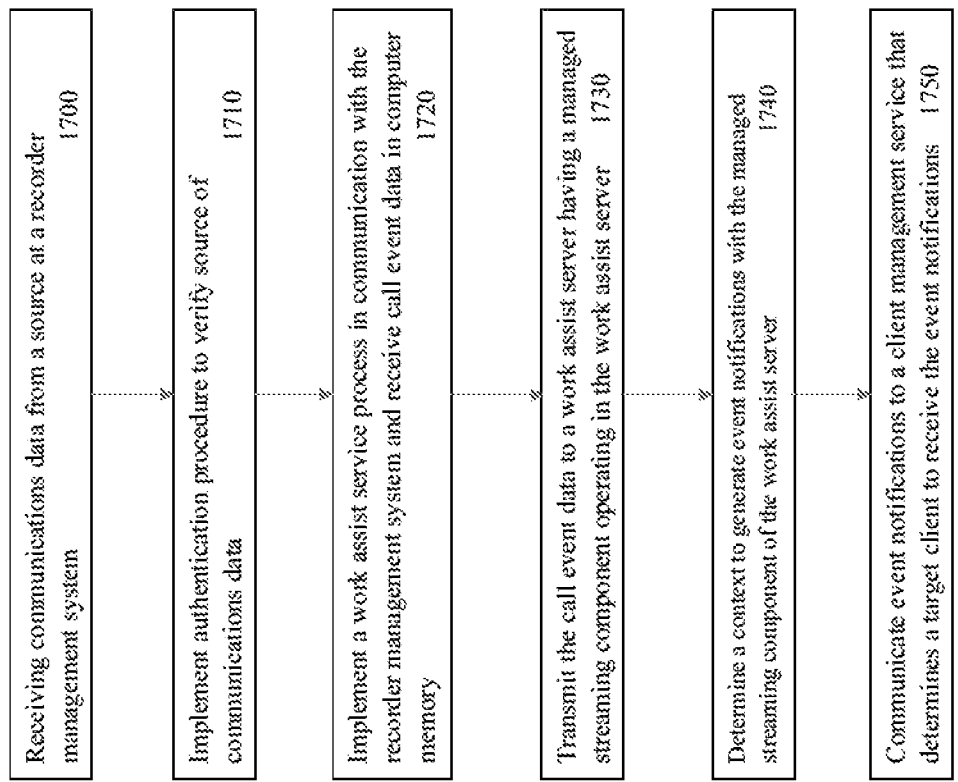
FIG. 17 is a flow chart of a method of managing call events distributed to client computers according to one embodiment of this disclosure.

The method of this disclosure is shown schematically in FIG. 17. At 1700, a method of providing real time contextual event notifications begins with receiving, at a recorder management system, communications data from a source, wherein the recorder management system includes a real time analytics framework, a real time integrations framework, a recorder integration server, and a recorder archive server. At least one authentication procedure 1710 is used to verify the source of the communications data. A recorder archive server provides computer memory within the recorder management system to implement a work assist service process and store call event data in the computer memory 1720. Call event data is transmitted 1730 from the recorder archive server to a work assist server having a managed streaming component operating in the work assist server. At 1740, call event data is processed at the managed streaming component to determine a context to generate event notifications. The work assist server communicates event notifications to a client management system that determines a target client to receive the event notifications at 1750.

Example Embodiments

A method of providing real time contextual event notifications includes receiving, at a recorder management system, communications data from a source, wherein the recorder management system includes a real time analytics framework, a real time integrations framework, a recorder integration server, and a recorder archive server. The method includes implementing at least one authentication procedure to verify the source of the communications data and using the recorder archive server to provide computer memory within the recorder management system and implementing a work assist service process and store call event data in the computer memory. The method transmits the call event data from the recorder archive server to a work assist server having a managed streaming component operating in the work assist server. Processing of the data occurs at the managed streaming component, and the call event data determines a context to generate event notifications. The method includes communicating event notifications to a client management system that determines a target client to receive the event notifications.

In one embodiment, the authentication procedure is a desktop authentication procedure communicated to the client management system from a web socket input and output server.

In another embodiment, the authentication procedure is a Daemon flow authentication procedure implemented by the recorder archive server in communication with a RESTful application program interface connected to the work assist server.

In another embodiment, the work assist service process utilizes the real time analytics framework in the recording management system to provide the context for call event data selected from the group consisting of real time speech analytics, voice biometric data, transcription services, audio quality analysis, category matching, and voiceprint matching.

In another embodiment, the work assist service process utilizes the real time integrations framework in the recording management system to provide the context for inbound call data selected from the group consisting of inbound call alerts, inbound call connection status, recording start data, recording stop data, and disconnection data.

In another embodiment, the work assist service process utilizes the real time integrations framework in the recording management system to provide the context for recording data selected from the group consisting of pausing and resuming alerts, recording system connection data, recording start and stop data, and disconnection data.

In another embodiment, the work assist service process utilizes the real time integrations framework in the recording management system to provide the context for blocked call data selected from the group consisting of blocked call alerts, block call connection data, blocked call recording options, blocked recording data, disconnection data.

In another embodiment, the processing further includes determining a current state of a call using the event messages; updating a cache with a most current event of the call; and adding the event notifications for consumption by a client management system (CMS) for delivery to the target client.

In another embodiment, the processing includes receiving feedback on the event notifications from the target client.

In another embodiment, storing call event data in the computer memory comprises storing the call event data in the computer memory according to rooms and tenants in the computer memory.

In another embodiment, storing the call event data according to tenants within the computer memory includes assigning a designated socket to each tenant.

In another embodiment, communicating event notifications to the client management system includes directing respective event notifications to a work assist client API according to respective socket inputs and outputs.

This disclosure encompasses a computer system with a memory storing computer-executable instructions and a processor configured to execute the computer-executable instructions and cause the computer system to perform a method of providing real time contextual event notifications. The computer system executes instructions to receive, at a recorder management system, communications data from a plurality of sources, wherein the recorder management system includes a real time analytics framework, a real time integrations framework, a recorder integration server, and a recorder archive server. The system implements implement at least one authentication procedure to verify a respective source of the communications data and uses the recorder archive server, providing computer memory within the recorder management system, to implement a work assist service process and store call event data in the computer memory. The system transmits the call event data from the recorder archive server to a work assist server having a managed streaming component operating in the work assist server. The system processes, at the managed streaming component, the call event data to determine a context to generate event notifications and communicates event notifications to a client management system that determines a target client to receive the event notifications.

In one embodiment of the computer system, the computer executable instructions reside on a recorder archive server implementing work assist service processes that comprise assigning tenant designations according to web socket inputs and outputs corresponding to a respective source.

In another embodiment of the computer system, the tenants are sections of memory set up in the recorder archive server, and respective tenants store call state data corresponding to the respective source.

In another embodiment of the computer system, storing the call state data includes storing real time speech analytics, voice biometric data, transcription services, audio quality analysis, category matching, and voiceprint matching.

In another embodiment of the computer system, storing the call state data includes storing inbound call alerts, inbound call connection status, recording start data, recording stop data, and disconnection data.

In another embodiment of the computer system, storing the call state data comprises recording pausing and resuming alerts, recording system connection data, recording start and stop data, and call disconnection data.

In another embodiment of the computer system, storing the call state data includes storing blocked call data selected from the group consisting of blocked call alerts, block call connection data, blocked call recording options, blocked recording data, and call disconnection data.

This disclosure encompasses a non-transitory computer readable medium having instructions that, when executed by a processor of a processing system, cause the processing system to perform a method of providing real time contextual event notifications. The instructions cause the processing system to receive, at a recorder management system, communications data from a plurality of sources, wherein the recorder management system includes a real time analytics framework, a real time integrations framework, a recorder integration server, and a recorder archive server. The instructions stored on the non-transitory computer readable medium include steps to implement at least one authentication procedure to verify a respective source of the communications data; use the recorder archive server providing computer memory within the recorder management system to implement a work assist service process and store call event data in the computer memory; transmit the call event data from the recorder archive server to a work assist server having a managed streaming component operating in the work assist server; process, at the managed streaming component, the call event data to determine a context to generate event notifications; and communicate event notifications to a client management system that determines a target client to receive the event notifications.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Thus, the real time contextual event notification system 100 of the present disclosure ingests events as streams from any authorized entity, applies rules to the event streams, determines a context of a support agent, and blends the rules and context to provide notifications to the support agent in accordance with the context.

What is claimed:

1. A method of providing real time contextual event notifications, comprising:
   receiving, at a recorder management system, communications data from a source, wherein the recorder management system includes a real time analytics framework, a real time integrations framework, a recorder integration server, and a recorder archive server;
   implementing at least one authentication procedure to verify the source of the communications data;
   use the recorder archive server providing computer memory within the recorder management system to implement a work assist service process and store call event data in the computer memory;
   transmit the call event data from the recorder archive server to a work assist server having a managed streaming component operating in the work assist server;
   processing, at the managed streaming component, the call event data to determine a context to generate event notifications, wherein the call event data includes blocked call data; and
   communicating event notifications to a client management system that determines a target client to receive the event notifications.

2. The method of claim 1, wherein the authentication procedure is a desktop authentication procedure communicated to the client management system from a web socket input and output server.

3. The method of claim 1, wherein the authentication procedure is a Daemon flow authentication procedure implemented by the recorder archive server in communication with a RESTful application program interface connected to the work assist server.

4. The method of claim 1, wherein the call event data further includes one or more of real time speech analytics, voice biometric data, transcription services, audio quality analysis, category matching, and voiceprint matching.

5. The method of claim 1, wherein the call event data further includes inbound call data selected from the group consisting of inbound call alerts, inbound call connection status, recording start data, recording stop data, and disconnection data.

6. The method of claim 1, wherein the call event data further includes recording data selected from the group consisting of pausing and resuming alerts, recording system connection data, recording start and stop data, and disconnection data.

7. The method of claim 1, wherein the blocked call data is selected from the group consisting of blocked call alerts, block call connection data, blocked call recording options, blocked recording data, disconnection data.

8. The method of claim 1, the processing further comprising:
   determining a current state of a call using the event messages;
   updating a cache with a most current event of the call; and
   adding the event notifications for consumption by a client management system (CMS) for delivery to the target client.

9. The method of claim 1, further comprising receiving feedback on the event notifications from the target client.

10. The method of claim 1, wherein storing the call event data in the computer memory comprises storing the call event data in the computer memory according to rooms and tenants in the computer memory.

11. The method of claim 10, wherein storing the call event data according to tenants within the computer memory comprises assigning a designated socket to each tenant.

12. The method of claim 11, wherein communicating the event notifications to the client management system comprises directing respective event notifications to a work assist client API according to respective socket inputs and outputs.

13. A computer system, comprising:
   a memory comprising computer-executable instructions; and
   a processor configured to execute the computer-executable instructions and cause the computer system to perform a method of providing real time contextual event notifications, the computer system executing instructions to:
   receive, at a recorder management system, communications data from a plurality of sources, wherein the recorder management system includes a real time analytics framework, a real time integrations framework, a recorder integration server, and a recorder archive server;

implement at least one authentication procedure to verify a respective source of the communications data;

use the recorder archive server providing computer memory within the recorder management system to implement a work assist service process and store call event data in the computer memory, wherein the call event data includes blocked call data;

transmit the call event data from the recorder archive server to a work assist server having a managed streaming component operating in the work assist server;

process, at the managed streaming component, the call event data to determine a context to generate event notifications; and communicate event notifications to a client management system that determines a target client to receive the event notifications.

14. The computer system according to claim 13, wherein the computer executable instructions reside on a recorder archive server implementing work assist service processes that comprise assigning tenant designations according to web socket inputs and outputs corresponding to a respective source.

15. The computer system according to claim 14, wherein the tenants are sections of memory set up in the recorder archive server, and respective tenants store the call event data corresponding to the respective source.

16. The computer system according to claim 15, wherein storing the call event data comprises storing real time speech analytics, voice biometric data, transcription services, audio quality analysis, category matching, and voiceprint matching.

17. The computer system of claim 15, wherein storing the call event data comprises storing inbound call alerts, inbound call connection status, recording start data, recording stop data, and disconnection data.

18. The computer system of claim 15, wherein storing the call event data comprises recording pausing and resuming alerts, recording system connection data, recording start and stop data, and call disconnection data.

19. The computer system of claim 15, wherein the blocked call data comprises one or more of of blocked call alerts, block call connection data, blocked call recording options, blocked recording data, and call disconnection data.

20. A non-transitory computer readable medium comprising instructions that, when executed by a processor of a processing system, cause the processing system to perform a method of providing real time contextual event notifications, comprising instructions to:

receive, at a recorder management system, communications data from a plurality of sources, wherein the recorder management system includes a real time analytics framework, a real time integrations framework, a recorder integration server, and a recorder archive server;

implement at least one authentication procedure to verify a respective source of the communications data;

use the recorder archive server providing computer memory within the recorder management system to implement a work assist service process and store call event data in the computer memory;

transmit the call event data from the recorder archive server to a work assist server having a managed streaming component operating in the work assist server;

process, at the managed streaming component, the call event data to determine a context to generate event notifications, wherein the call event data includes blocked call data; and communicate event notifications to a client management system that determines a target client to receive the event notifications.

\* \* \* \* \*